United States Patent
Hawkins et al.

(10) Patent No.: US 11,651,277 B2
(45) Date of Patent: May 16, 2023

(54) SPARSE DISTRIBUTED REPRESENTATION FOR NETWORKED PROCESSING IN PREDICTIVE SYSTEM

(71) Applicant: Numenta, Inc., Redwood City, CA (US)

(72) Inventors: Jeffrey C. Hawkins, Atherton, CA (US); Ronald Marianetti, II, Campbell, CA (US); Anosh Raj, Palo Alto, CA (US); Subutai Ahmad, Palo Alto, CA (US)

(73) Assignee: Numenta, Inc., Redwood City, CA (US)

( * ) Notice: Subject to any disclaimer, the term of this patent is extended or adjusted under 35 U.S.C. 154(b) by 823 days.

(21) Appl. No.: 16/696,979

(22) Filed: Nov. 26, 2019

(65) Prior Publication Data

US 2020/0097857 A1    Mar. 26, 2020

Related U.S. Application Data

(63) Continuation-in-part of application No. 16/291,862, filed on Mar. 4, 2019, now Pat. No. 11,270,202.
(Continued)

(51) Int. Cl.
*G06N 20/00* (2019.01)
*G06N 3/049* (2023.01)
(Continued)

(52) U.S. Cl.
CPC ............ *G06N 20/00* (2019.01); *G06N 3/047* (2023.01); *G06N 3/049* (2013.01); *G06N 7/01* (2023.01)

(58) Field of Classification Search
None
See application file for complete search history.

(56) References Cited

U.S. PATENT DOCUMENTS

| 4,766,534 A | 8/1988 | DeBenedictis |
| 4,845,744 A | 7/1989 | DeBenedictis |

(Continued)

FOREIGN PATENT DOCUMENTS

| EP | 1 557 990 | 7/2005 |
| WO | WO 2009/006231 | 6/2006 |

(Continued)

OTHER PUBLICATIONS

Uetz et al., Large-scale Object Recognition with CUDA-accelerated Hierarchical Neural Networks, IEEE 2009, pp. 536-541 (Year: 2009).*

(Continued)

*Primary Examiner* — Alan Chen
(74) *Attorney, Agent, or Firm* — WTA Patents

(57) ABSTRACT

A processing node in a temporal memory system includes a spatial pooler and a sequence processor. The spatial pooler generates a spatial pooler signal representing similarity between received spatial patterns in an input signal and stored co-occurrence patterns. The spatial pooler signal is represented by a combination of elements that are active or inactive. Each co-occurrence pattern is mapped to different subsets of elements of an input signal. The spatial pooler signal is fed to a sequence processor receiving and processed to learn, recognize and predict temporal sequences in the input signal. The sequence processor includes one or more columns, each column including one or more cells. A subset of columns may be selected by the spatial pooler signal, causing one or more cells in these columns to activate.

20 Claims, 23 Drawing Sheets

Related U.S. Application Data which is a continuation of application No. 14/880,034, filed on Oct. 9, 2015, now Pat. No. 10,275,720, which is a continuation of application No. 13/046,464, filed on Mar. 11, 2011, now Pat. No. 9,189,745.

(60) Provisional application No. 61/411,665, filed on Nov. 9, 2010, provisional application No. 61/381,886, filed on Sep. 10, 2010, provisional application No. 61/314,096, filed on Mar. 15, 2010.

(51) Int. Cl.
    *G06N 3/047* (2023.01)
    *G06N 7/01* (2023.01)

(56) References Cited

U.S. PATENT DOCUMENTS

| | | |
|---|---|---|
| 5,113,507 A | 5/1992 | Jaeckel |
| 5,255,348 A | 10/1993 | Nenov |
| 5,712,953 A | 1/1998 | Langs |
| 5,729,661 A | 3/1998 | Keeler et al. |
| 5,761,389 A | 6/1998 | Maeda et al. |
| 6,028,608 A | 2/2000 | Jenkins |
| 6,122,014 A | 9/2000 | Panusopone et al. |
| 6,144,711 A | 11/2000 | Raleigh et al. |
| 6,195,622 B1 | 2/2001 | Altschuler et al. |
| 6,400,996 B1 | 6/2002 | Hoffberg et al. |
| 6,468,069 B2 | 10/2002 | Lemelson et al. |
| 6,567,814 B1 | 5/2003 | Banker et al. |
| 6,615,211 B2 | 9/2003 | Beygelzimer et al. |
| 6,625,585 B1 | 9/2003 | MacCuish et al. |
| 6,714,941 B1 | 3/2004 | Lerman et al. |
| 6,751,343 B1 | 6/2004 | Ferrell et al. |
| 6,957,241 B2 | 10/2005 | George |
| 7,088,693 B2 | 8/2006 | George |
| 7,251,637 B1 | 7/2007 | Caid et al. |
| 7,308,134 B2 | 12/2007 | Wersing et al. |
| 7,430,546 B1 | 9/2008 | Suri |
| 7,613,675 B2 | 11/2009 | Hawkins et al. |
| 7,620,608 B2 | 11/2009 | Jaros et al. |
| 7,624,085 B2 | 11/2009 | Hawkins et al. |
| 7,676,458 B2 | 3/2010 | Aggarwal et al. |
| 7,739,208 B2 | 6/2010 | George et al. |
| 7,778,946 B2 | 8/2010 | Hercus |
| 7,826,990 B2 | 11/2010 | Nasle et al. |
| 7,840,395 B2 | 11/2010 | Nasle et al. |
| 7,840,396 B2 | 11/2010 | Radibratovic et al. |
| 7,844,439 B2 | 11/2010 | Nasle et al. |
| 7,844,440 B2 | 11/2010 | Nasle et al. |
| 7,899,775 B2 | 3/2011 | George et al. |
| 7,904,412 B2 | 3/2011 | Saphir et al. |
| 7,937,342 B2 | 5/2011 | George et al. |
| 7,941,389 B2 | 5/2011 | Marianetti et al. |
| 7,941,392 B2 | 5/2011 | Saphir |
| 7,958,280 B2 | 6/2011 | Salessi et al. |
| 7,983,998 B2 | 7/2011 | George et al. |
| 8,037,010 B2 | 10/2011 | Jaros et al. |
| 8,081,209 B2 | 12/2011 | Ji et al. |
| 8,102,423 B2 | 1/2012 | Cheng |
| 8,103,603 B2 | 1/2012 | George et al. |
| 8,112,367 B2 | 2/2012 | George et al. |
| 8,121,961 B2 | 2/2012 | George et al. |
| 8,175,981 B2 | 5/2012 | Hawkins et al. |
| 8,175,984 B2 | 5/2012 | George |
| 8,175,985 B2 | 5/2012 | Sayfan et al. |
| 8,195,582 B2 | 6/2012 | Niemasik et al. |
| 8,219,507 B2 | 7/2012 | Jaros et al. |
| 8,285,667 B2 | 10/2012 | Jaros et al. |
| 8,290,886 B2 | 10/2012 | George et al. |
| 8,391,618 B1 * | 3/2013 | Chuang ............... G06V 30/274 382/224 |
| 10,275,720 B2 | 4/2019 | Hawkins et al. |
| 2002/0002688 A1 | 1/2002 | Gregg et al. |
| 2002/0150044 A1 | 10/2002 | Wu et al. |
| 2002/0161736 A1 | 10/2002 | Beygelzimer et al. |
| 2003/0069002 A1 | 4/2003 | Hunter et al. |
| 2003/0123732 A1 | 7/2003 | Miyazaki et al. |
| 2003/0167111 A1 | 9/2003 | Kipersztok et al. |
| 2004/0002838 A1 | 1/2004 | Oliver et al. |
| 2004/0142325 A1 | 7/2004 | Mintz et al. |
| 2004/0148520 A1 | 7/2004 | Talpade et al. |
| 2004/0267395 A1 | 12/2004 | Discenzo et al. |
| 2005/0002572 A1 | 1/2005 | Saptharishi et al. |
| 2005/0028033 A1 | 2/2005 | Kipersztok et al. |
| 2005/0063565 A1 | 3/2005 | Nagaoka et al. |
| 2005/0190990 A1 | 9/2005 | Burt et al. |
| 2005/0222811 A1 | 10/2005 | Jakobson et al. |
| 2006/0093188 A1 | 5/2006 | Blake et al. |
| 2006/0161736 A1 | 7/2006 | Huang |
| 2006/0184462 A1 | 8/2006 | Hawkins |
| 2006/0212444 A1 | 9/2006 | Handman et al. |
| 2006/0235320 A1 | 10/2006 | Tan et al. |
| 2006/0248026 A1 | 11/2006 | Aoyama et al. |
| 2006/0248073 A1 | 11/2006 | Jones et al. |
| 2006/0253491 A1 | 11/2006 | Gokturk et al. |
| 2006/0259163 A1 | 11/2006 | Hsiung et al. |
| 2007/0005531 A1 | 1/2007 | George et al. |
| 2007/0019754 A1 | 1/2007 | Raleigh et al. |
| 2007/0192264 A1 | 8/2007 | Hawkins et al. |
| 2007/0192267 A1 | 8/2007 | Hawkins et al. |
| 2007/0192268 A1 | 8/2007 | Hawkins et al. |
| 2007/0192269 A1 | 8/2007 | Saphir et al. |
| 2007/0192270 A1 | 8/2007 | Hawkins et al. |
| 2007/0228703 A1 | 10/2007 | Breed |
| 2007/0276744 A1 | 11/2007 | Burke |
| 2007/0276774 A1 | 11/2007 | Ahmad et al. |
| 2008/0059389 A1 | 3/2008 | Jaros et al. |
| 2008/0140593 A1 | 6/2008 | George et al. |
| 2008/0183647 A1 | 7/2008 | Hawkins et al. |
| 2008/0201286 A1 | 8/2008 | Hawkins et al. |
| 2008/0208783 A1 | 8/2008 | Jaros et al. |
| 2008/0208915 A1 | 8/2008 | George et al. |
| 2008/0208966 A1 | 8/2008 | Edwards et al. |
| 2009/0006289 A1 | 1/2009 | Jaros et al. |
| 2009/0116413 A1 | 5/2009 | George |
| 2009/0150311 A1 | 6/2009 | George |
| 2009/0240886 A1 | 9/2009 | Sayfan et al. |
| 2009/0313193 A1 | 12/2009 | Hawkins et al. |
| 2010/0049677 A1 | 2/2010 | Jaros et al. |
| 2010/0185567 A1 | 7/2010 | Niemasik et al. |
| 2010/0191684 A1 | 7/2010 | George |
| 2010/0207754 A1 | 8/2010 | Shostak et al. |
| 2010/0312730 A1 | 12/2010 | Weng et al. |
| 2011/0047110 A1 | 2/2011 | Rinkus |
| 2011/0231351 A1 | 9/2011 | George et al. |
| 2012/0005134 A1 | 1/2012 | Jaros et al. |
| 2012/0166364 A1 | 6/2012 | Ahmad et al. |
| 2012/0197823 A1 | 8/2012 | Hawkins et al. |
| 2013/0159232 A1 | 6/2013 | Rhodes |

FOREIGN PATENT DOCUMENTS

| | | |
|---|---|---|
| WO | WO 2008/067326 | 6/2008 |
| WO | WO 2006/063291 | 1/2009 |

OTHER PUBLICATIONS

United States Office Action, U.S. Appl. No. 16/291,862, dated Dec. 3, 2021, 11 pages.
"HTM Algorithms," Numenta.RTM., Jun. 2008, Numenta HTM Workshop, Jun. 23-24, 2008, SRI Campus, Menlo Park, CA, 67 pages.
"HTM Optimized Drug Therapy," SDSystem24.com, Numenta HTM Workshop, Jun. 2324, 2008, SRI Campus, Menlo Park, CA 7 pages.
"HTM Workshop, Jumpstart," Numenta.RTM., Jun. 2008, Numenta HTM Workshop, Jun. 23-24, 2008, SRI Campus, Menlo Park, 86 pages.
"Partial Transcript from Numenta HTM Workshop DVD Disc 1," Numenta, Jun. 2008, 6 pages.
"Problem Solving with HTMs," Numenta.RTM., Jun. 2008, Numenta HTM Workshop, Jun. 23-24, 2008, SRI Campus, Menlo Park, CA, 23 pages.

(56) References Cited

OTHER PUBLICATIONS

"Vision Framework," Numenta.RTM., Jun. 2008, Numenta HTM Workshop, Jun. 23-24, 2008, SRI Campus, Menlo Park, CA 36 pages.
A Genetic Sparse Distributed Memory Approach to the Application of Handwritten Character Recognition, by Fan et al., published 1997.
Adelson, E.H. et al., "The Perception of Shading and Reflectance," Perception as Bayesian Inference, 1996, pp. 409-423, Knill, D.C. et al., eds., Cambridge University Press, UK.
Agrawal, R. et al., "Mining Sequential Patterns," IEEE, 1995, pp. 3-14.
Ahmad, S. et al., "PowerNuPIC," Numenta, Jun. 2008, Numenta HTM Workshop, Jun. 23-24, 2008, SRI Campus, Menlo Park, CA, fifty-six pages.
Ahmad, S., "NuPIC Jumpstart—Part II," Numenta, May 2008, Numenta HTM Workshop, Jun. 23-24, 2008, SRI Campus, Menlo Park, CA, thirty-three pages.
Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008. Retrieved from the Internet<URL:http://web.archive.org/web/20070319232606/http://www.numenta.com/for-developers/softare/pdf/nupic_prog_guide.pdf>.
Åslin, F., "Evaluation of Hierarchical Temporal Memory in Algorithmic Trading," Thesis, Linkopings Universitet, Feb. 8, 2010, 37 pages.
Becerra, J.A. et al., "Multimodule Artificial Neural Network Architectures for Autonomous Robot Control Through Behavior Modulation," IWANN 2003, LNCS, pp. 169-176, vol. 2687.
Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.
Bobier, B., "Content-Based Image Retrieval Using Hierarchical Temporal Memory," Numenta HTM Workshop, Jun. 23-24, 2008, SRI Campus, Menlo Park, CA, seven pages.
Bradski, G. et al., "Fast-Learning VIEWNET Architectures for Recognizing Three-dimensional Objects from Multiple Two-dimensional Views," Neural Networks, 1995, pp. 1053-1080, vol. 8, No. 7/8.
Bryhni et al., "A Comparison of Load Balancing Ttechniques for Scalable Web Servers," IEEE Network, Jul./Aug. 2000, pp. 58-64.
Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.
Chapela, V., "Preventing Financial Fraud," Smart Security Services, Numenta HTM Workshop, 2009, forty pages.
Chinese Office Action, Chinese Application No. 200580042258.7, dated Jul. 10, 2009, twelve pages.
Chinese Office Action, Chinese Application No. 200780007274.1, dated Jun. 24, 2011, five pages.
Colombe, J., "A Survey of Recent Developments in Theoretical Neuroscience and Machine Vision," Proceedings of the IEEE Applied Imagery Pattern Recognition Workshop, 2003, nine pages.
Cormack, G.V. et al., "Data Compression Using Dynamic Markov Modelling," The Computer Journal, 1987, pp. 541-550, vol. 30, No. 6.
Csapo, A.B. et al., "Object Categorization Using VFA-Generated Nodemaps and Hierarchical Temporal Memories," IEEE International Conference on Computational Cybernetics, Oct. 7, 2007, pp. 257-262.
Curry, C. et al., "Speech Processing with HTM," Numenta HTM Workshop, Jun. 23-24, 2008, SRI Campus, Menlo Park, CA, fifty-seven pages.
Dean, T., "Learning Invariant Features Using Inertial Priors," Annals of Mathematics and Artificial Intelligence, 2006, pp. 223-250, vol. 47.
Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.
Dimitrova, N. et al., "Motion Recovery for Video Content Classification," ACM Transactions on Information Systems, Oct. 1995, pp. 408-439, vol. 13, No. 4.
Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.
Dolin, R. et al., "Scalable Collection Summarization and Selection," Association for Computing Machinery, 1999, pp. 49-58.
Dubinsky, D., "Numenta Business Strategy," Numenta, Jun. 2008, Numenta HTM Workshop, Jun. 23-24, 2008, SRI Campus, Menlo Park, CA, fifteen pages.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
Edsa, "Project Information," Apr. 2008, Numenta HTM Workshop, Jun. 23-24, 2008, SRI Campus, Menlo Park, CA, four pages.
Eswaran, K., "Numenta Lightning Talk on Dimension Reduction and Unsupervised Learning," Numenta HTM Workshop, Jun. 23-24, 2008, SRI Campus, Menlo Park, CA, thirty pages.
European Examination Report, European Application No. 11756775.0, dated Feb. 19, 2016, 6 pages.
European Examination Report, European Application No. 11756775.0, dated Oct. 12, 2016, 4 pages.
European Patent Office, Examination Report European Patent Application No. 07750385.2, dated Dec. 6, 2010, eight pages.
European Patent Office, Examination Report, European Application No. 05853611.1, dated Jun. 23, 2008, four pages.
European Patent Office, Examination Report, European Application No. 07750385.2, dated Apr. 21, 2009, eight pages.
European Patent Office, Examination Report, European Patent Application No. 08796030.8, dated Dec. 6, 2010, seven pages.
European Patent Office, Examination Report, European Patent Application No. 11756775.0, dated Jan. 7, 2015, eight pages.
European Patent Office, Supplementary European Search Report and Opinion, European Patent Application No. 11756775.0, dated Oct. 1, 2013, eight pages.
Farahmand, N. et al., "Online Temporal Pattern Learning," Proceedings of the International Joint Conference on Neural Networks, Jun. 14-19, 2009, pp. 797-802, Atlanta, GA, USA.
Felleman, D.J. et al., "Distributed Hierarchical Processing in the Primate Cerebral Cortex," Cerebral Cortex, Jan./Feb. 1991, pp. 1-47, vol. 1.
Fine, S. et al., "The Hierarchical Hidden Markov Model: Analysis and Applications," Machine Learning, 1998, pp. 41-62, vol. 32, Kluwer Academic Publishers, Boston.
Finley, M., "Exploration of Motion Capture," Qualia Labs, Jun. 24, 2008, Numenta HTM Workshop, Jun. 23-24, 2008, SRI Campus, Menlo Park, CA, thirty-six pages.
Foldiak, P., "Learning Invariance from Transformation Sequences," Neural Computation, 1991, pp. 194-200, vol. 3, No. 2.
Fukushima, K., "Neocognitron: A Self-Organizing Neural Network Model for a Mechanism of Pattern Recognition Unaffected by Shift in Position," Biol. Cybernetics, 1980, pp. 193-202, vol. 36.
Garalevicius, S., "Memory-Prediction Framework for Pattern Recognition: Performance and Suitability of the Bayesian Model of Visual Cortex," American Association of Artificial Intelligence, 2007, six pages.
George, D. "Thesis: How the Brain Might Work," Dept. of Electrical Engineering and the Committee on Graduate Studies of Stanford University, Jun. 2008, one-hundred ninety-one pages.
George, D. et al., "A Hierarchical Bayesian Model of Invariant Pattern Recognition in the Visual Cortex," Mar. 2005.
George, D. et al., "A Hierarchical Bayesian Model of Invariant Pattern Recognition in the Visual Cortex," Proceedings, 2005 IEEE International Joint Conference on Neural Networks, Jul. 31-Aug. 4, 2005, pp. 1812-1817, vol. 3.

(56) References Cited

OTHER PUBLICATIONS

George, D. et al., "Invariant Pattern Recognition Using Bayesian Inference on Hierarchical Sequences," Technical Report, Sep. 17, 2004, pp. 1-8.
George, D. et al., "Invariant Pattern Recognition Using Bayesian Inference on Hierarchical Sequences," Technical Report, Oct. 2004, eight pages.
George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.
George, D. et al., "Towards a Mathematical Theory of Cortical Micro-circuits," PLoS Computational Biology, Oct. 2009, vol. 5, Issue 10, twenty-six pages.
Gottschalk, K. et al., "Introduction to Web Services Architecture," IBM Systems Journal, 2002, pp. 170-177, vol. 41, No. 2.
Gripon, V. et al., "Sparse Neural Networks with Large Learning Diversity," IEEE Transactions on Neural Networks, Jul. 2011, pp. 1087-1096, vol. 22, No. 7.
Guerrier, P., "A Generic Architecture for On-Chip Packet-Switched Interconnections," Association for Computing Machinery, 2000, pp. 250-256.
Guinea, D. et al., "Robot Learning to Walk: An Architectural Problem for Intelligent Controllers," Proceedings of the 1993 International Symposium on Intelligent Control, Aug. 1993, pp. 493-498, Chicago, USA.
Guo, C-E. et al., "Modeling Visual Patterns by Integrating Descriptive and Generative Methods," International Journal of Computer Vision, May 29, 2003, pp. 5-29, vol. 53, No. 1.
Haitani, R. et al., "Vitamin D Toolkit, Introduction," Jun. 24, 2008, Numenta HTM Workshop, Jun. 23-24, 2008, SRI Campus, Menlo Park, CA, eleven pages.
Haitani, R., "Smart Video: A Disruptive Market Opportunity for HTM," Numenta HTM Workshop, 2009, twelve pages.
Han, K. et al., "Automated Robot Behavior Recognition Applied to Robotic Soccer," In Proceedings of the IJCAI-99 Workshop on Team Behaviors and Plan Recognition, 1999, six pages.
Haritaoglu, I. et al., "W4: Real-Time Surveillance of People and Their Activities," IEEE Transactions on Pattern Analysis and Machine Intelligence, Aug. 2000, pp. 809-830, vol. 22, No. 8.
Hartung, J. et al., "Presentation: Support for the Use of Hierarchical Temporal Memory Systems in Automated Design Evaluation: A First Experiment," Numenta HTM Workshop, 2009, thrity-one pages.
Hartung, J. et al., "Support for the Use of Hierarchical Temporal Memory Systems in Automated Design Evaluation: A First Experiment," Proceedings of the ASME 2009 Int'l. Design Engineering Technical Conferences & Computers and Information in Engineering Conference, Aug. 30-Sep. 2, 2009, ten pages, San Diego, CA, USA.
Hasegawa, Y. et al., "Learning Method for Hierarchical Behavior Controller," Proceedings of the 1999 IEEE International Conference on Robotics & Automation, May 1999, pp. 2799-2804.
Hawkins, J. "Hierarchical Temporal Memory: History-Progress-Today-Tomorrow," HTM Workshop, Jun. 2009, twenty-four pages.
Hawkins, J. "Prediction Toolkit Overview," Numenta HTM Workshop, 2009, four pages.
Hawkins, J. et al., "Hierarchical Temporal Memory, Concepts, Theory, and Terminology," Numenta, May 10, 2006, pp. 1-19.
Hawkins, J. et al., "Hierarchical Temporal Memory, Concepts, Theory, and Terminology," Numenta, Jan. 27, 2007, pp. 1-20.
Hawkins, J. et al., "Hierarchical Temporal Memory: Concepts, Theory and Terminology," Numenta, Mar. 27, 2007, [Online] [Retrieved on Oct. 7, 2008] Retrieved from the Internet<URL:http://www.numenta.com/Numenta_HTM_Concepts.pdf>.
Hawkins, J. et al., "Hierarchical Temporal Memory: Concepts, Theory and Terminology," Numenta, May 10, 2006, [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.
Hawkins, J. et al., "On Intelligence," Sep. 2004, Times Books, Henry Holt and Company, New York, NY 10011.
Hawkins, J. et al., "Sequence Memory for Prediction, Inference and Behaviour," Philosophical Transactions of the Royal Society B, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full-.pdf.>.
Hawkins, J., "Why Can't a Computer Be More Like a Brain?" IEEE Spectrum, Apr. 1, 2007, pp. 21-26, vol. 44, No. 4.
Hernandez-Gardiol, N. et al., "Hierarchical Memory-Based Reinforcement Learning," Proceedings of Neural Information Processing Systems, 2001, seven pages.
Hierarchical Sparse Distributed Representations of Sequence Recall and Recognition, by Rinkus, published 2006.
Hinton, G.E. et al., "The "Wake-Sleep" Algorithm for Unsupervised Neural Networks," Science, May 26, 1995, pp. 1158-1161, vol. 268.
Hoey, "Hierarchical unsupervised learning of facial expression categories," IEEE, 2001, 0-7695-1293-3, pp. 99-106.
Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.
Isard, M. et al., "Icondensation: Unifying Low-Level and High-Level Tracking in a Stochastic Framework," Lecture Notes in Computer Science 1406, 1998, pp. 893-908, Burkhardt, H. et al., ed., Springer-Verlag, Berlin.
Kim, J. et al., "Hierarchical Distributed Genetic Algorithms: A Fuzzy Logic Controller Design Application," IEEE Expert, Jun. 1996, pp. 76-84.
Kuenzer, A. et al., "An Empirical Study of Dynamic Bayesian Networks for User Modeling," Proceedings of the UM 2001 Workshop on Machine Learning, ten pages.
Lee, T.S. et al., "Hierarchical Bayesian Inference in the Visual Cortex," J. Opt. Soc. Am. A. Opt. Image. Sci. Vis., Jul. 2003, pp. 1434-1448, vol. 20, No. 7.
Lenser, S. et al., "A Modular Hierarchical Behavior-Based Architecture," RoboCup 2001, LNAI 2377, 2002, pp. 423-428, Birk, A. et al., (eds.), Springer-Verlag, Berlin, Heidelberg.
Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.
Lewicki, M.S. et al., "Bayesian Unsupervised Learning of Higher Order Structure," Proceedings of the 1996 Conference in Advances in Neural Information Processing Systems 9, pp. 529-535.
Lim, "Estimation of Occlusion and Dense Motion Fields in a Bidirectional Bayesian Framework," IEEE Transactions on Pattern Analysis and Machine Intelligence, 2002, pp. 712-718, vol. 24, No. 5.
Lo, J. "Unsupervised Hebbian Learning by Recurrent Multilayer Neural Networks for Temporal Hierarchical Pattern Recognition," Information Sciences and Systems 44th Annual Conference on Digital Object Identifier, 2010, pp. 1-6.
Mahadevan, S. et al., "Validation of reliability computational models using Bayes networks," Reliability Engineering & System Safety, 2005, pp. 223-232, vol. 87.
Majure, L., "Unsupervised Phoneme Acquisition Using HTM," Jun. 25, 2009, eight pages.
Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.
Mari, J.-F. et al., "Temporal and Spatial Data Mining with Second-Order Hidden Markov Models," Soft Computing—A Fusion of Foundations, Methodologies and Applications, 2006, pp. 406-414, vol. 10, No. 5.
McDowell, C. et al., "SlugGo, a Computer Go Program," Numenta HTM Workshop, Jun. 23-24, 2008, SRI Campus, Menlo Park, CA, eighteen pages.

(56) References Cited

OTHER PUBLICATIONS

Miller, J. W. et al., "Biomimetic Sensory Abstraction Using Hierarchical Quilted Self-Organizing Maps," Society of Photo-Optical Instrumentation Engineers, 2006, eleven pages.
Mishkin, M. et al., "Hierarchical Organization of Cognitive Memory," Phil. Trans. R. Soc. B., 1997, pp. 1461-1467, London.
Mitrovic, A., "An Intelligent SQL Tutor on the Web," International Journal of Artificial Intelligence in Education, 2003, pp. 171-195, vol. 13.
Muckli, L., "Predictive Coding in Apparent Motion," University of Glasgow, Numenta HTM Workshop, Jun. 25, 2009, twelve pages.
Murphy, K. et al., "Using the Forest to See the Trees: A Graphical Model Relating Features, Objects and Scenes,"Advances in Neural Processing System, 2004, vol. 16, eight pages.
Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.
Nair, D. et al., "Bayesian Recognition of Targets by Parts in Second Generation Forward Looking Infrared Images," Image and Vision Computing, 2000, pp. 849-864, vol. 18.
Namphol, A. et al., "Image Compression with a Hierarchical Neural Network," IEEE transactions on Aerospace and Electronic Systems, Jan. 1996, pp. 326-338, vol. 32, No. 1.
Naphade, M. et al., "A Probabilistic Framework for Semantic Video Indexing, Filtering, and Retrieval," IEEE Transactions on Multimedia, Mar. 2001, pp. 141-151, vol. 3, No. 1.
Naphade, M. et al., "Discovering Recurrent Events in Video Using Unsupervised Methods," IEEE ICIP, 2002, pp. 11-13 through 11-16.
Niemasik, J. "Vision Toolkit," Numenta HTM Workshop, 2009, twenty-eight pages.
Numenta, Inc., "Business Strategy," Numenta HTM Workshop, 2009, fifteen pages.
Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalL- earningAlgorithms.pdf.>.
Numenta, Inc., "Hierarchical Temporal Memory: Comparison with Existing Models, Version 1.01," Mar. 1, 2007, four pages.
Numenta, Inc., "HTM Algorithms," Jun. 2008, Numenta HTM Workshop, Jun. 23-24, 2008, SRI Campus, Menlo Park, CA, sixty-seven pages.
Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Numenta Node Algorithms Guide NuPIC 1.6," Numenta, Jul. 22, 2008, pp. 1-7.
Numenta, Inc., "Numenta Node Algorithms Guide NuPIC 1.6," Numenta, Jun. 13, 2008, pp. 1-6.
Numenta, Inc., "Numenta Platform for Intelligent Computing: Programmer's Guide Version 1.0," Mar. 2007, seventy-seven pages.
Numenta, Inc., "NuPIC Update," Numenta HTM Workshop, 2009, twenty-four pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Prototype to Demonstrate Automated Insect Detection and Discrimination," Numenta HTM Workshop, 2009, four pages.
Numenta, Inc., "Smart Music: Combining Musical Expectations with Algorithmic Composition," Numenta HTM Workshop, 2009, seven pages.
Numenta, Inc., "Technical Keynote," Numenta HTM Workshop, 2009, seventy-two pages.
Numenta, Inc., "Temporal Model Characteristics," Numenta HTM Workshop, 2009, fourteen pages.
Numenta, Inc., "Vision Framework," Jun. 2008, Numenta HTM Workshop, Jun. 23-24, 2008, SRI Campus, Menlo Park, CA, thirty-six pages.
Numenta, Inc., "What Have We Worked on Since the 2008 Workshop? Customer Applications Presentation," Numenta HTM Workshop, 2009, thirty-five pages.
Numenta, Inc., "Zetal Algorithms Reference, Version 1.0," Numenta Inc., Mar. 1, 2007, pp. 1-36.
Numenta, Inc., "Zetal Algorithms Reference, Version 1,2," Numenta Inc., Jun. 8, 2007, pp. 1-38.
Numenta, Inc., "Zetal Algorithms Reference, Version 1.3," Numenta Inc., Aug. 22, 2007, pp. 1-41.
Numenta, Inc., "Zetal Algorithms Reference, Version 1.5," Numenta Inc., Aug. 24, 2007, pp. 1-45.
Olshausen, B.A. et al., "A Neurobiological Model of Visual Attention and Invariant Pattern Recognition Based on Dynamic Routing Information," Journal of Neuroscience, Nov. 1993, pp. 4700-4719, vol. 13, No. 11.
Online Temporal Pattern Learning, by Farahmand et al., published Jun. 2009.
Park, S. et al., "Recognition of Two-person Interactions Using a Hierarchical Bayesian Network," ACM SIGMM International Workshop on Video Surveillance (IWVS) 2003, pp. 65-76, Berkeley, USA.
PCT International Search Report and Written Opinion, PCT Application No. PCT/US2008/080347, dated Dec. 10, 2008, six pages.
PCT International Search Report and Written Opinion, PCT Application No. PCT/US2005/044729, dated May 14, 2007, twelve pages.
PCT International Search Report and Written Opinion, PCT Application No. PCT/US2007/003544, dated Jun. 16, 2008, ten pages.
PCT International Search Report and Written Opinion, PCT Application No. PCT/US07/85661, dated Jun. 13, 2008, six pages.
PCT International Search Report and Written Opinion, PCT Application No. PCT/US08/55389, dated Jul. 25, 2008, seven pages.
PCT International Search Report and Written Opinion, PCT Application No. PCT/US08/55352, dated Aug. 1, 2008, seven pages.
PCT International Search Report and Written Opinion, PCT Application No. PCT/US2008/054631, dated Aug. 18, 2008, twelve pages.
PCT International Search Report and Written Opinion, PCT Application No. PCT/US2008/068435, dated Oct. 31, 2008, eleven pages.
PCT International Search Report and Written Opinion, PCT Application No. PCT/US2009/035193, dated Apr. 22, 2009, eleven pages.
PCT International Search Report and Written Opinion, PCT Application No. PCT/US2011/028231, dated May 19, 2011, nine pages.
PCT International Search Report and Written Opinion, PCT Application No. PCT/US2009/047250, dated Sep. 25, 2009, twelve pages.
Pearl, J., "Probabilistic Reasoning in Intelligent Systems: Networks of Plausible Inference," 1988, pp. 143-223, Morgan Kaufmann Publishers, Inc.
Pilka, F. et al., "Multi-step Ahead Prediction Using Neural Networks," 53.sup.rd International Symposium ELMAR-2011, Sep. 14-16, 2011, pp. 269-272, Zadar, Croatia.
Poppel, E., "A Hierarchical Model of Temporal Perception," Trends in Cognitive Sciences, May 1997, pp. 56-61, vol. 1, No. 2.
Poritz, A., "Linear Predictive Hidden Markov Models and the Speech Signal," IEEE, 1982, pp. 1291-1294.
Rao, R. et al., "Predictive Coding in the Visual Cortex: A Functional Interpretation of Some Extra-classical Receptive-field Effects," Nature Neuroscience, Jan. 1999, pp. 79-87, vol. 2, No. 1.
Representation and Processing of Structures with Binary Sparse Distributed Codes, by Rachkovskij, published Apr. 2001.
Riesenhuber, M. et al., "Hierarchical Models of Object Recognition in Cortex," Nature Neuroscience, Nov. 1999, pp. 1019-1025, vol. 2, No. 11.
Robinson, D. et al., "Spoken Language Identification with Hierarchical Temporal Memories," 2009 CS229 Course on Machine Learning at Stanford University, Dec. 11, 2009, five pages. [Online] [Retrieved Sep. 19, 2013] Retrieved from the Internet <URL: http://cs229.stanford.edu/proj2009/FalcoLeungRobinson.pdf.>.
Rojas, R., "Neural Networks, A Systematic Approach," Springer-Verlag, 1996, pp. 20-21, 110-112, and 311-319.

(56) References Cited

OTHER PUBLICATIONS

Ross, L., "Discovering and Using Patterns in Plant Floor Data," Numenta HTM Workshop, Jun. 23-24, 2008, SRI Campus, Menlo Park, CA, twelve pages.
Rozell, C.J. et al., "Sparse Coding Via Thresholding and Local Competition in Neural Circuits," Neural Computation, 2008, pp. 2526-2563, vol. 20, No. 10.
Saphir, B. "Numenta Web Services," Numenta HTM Workshop, 2009, twenty pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
SDSYSTEM24.com, "HTM Optimized Drug Therapy," Numenta HTM Workshop, Jun. 23-24, 2008, SRI Campus, Menlo Park, CA, seven pages.
Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.
Spatio-Temporal Memories for Machine Learning: A Long-Term Memory Organization Spatio-Temporal Memories for Machine Learning: A Long-Term Memory Organization, by Starzyk et al., published May 2009.
Spence, C. et al., "Varying Complexity in Tree-Structured Image Distribution Models," IEEE Transactions on Image Processing, Feb. 2006, pp. 319-330, vol. 15, No. 2.
Starzyk, J.A. et al., "Spatio-Temporal Memories for Machine Learning: A Long-Term Memory Organization," IEEE Transactions on Neural Networks, May 2009, pp. 768-780, vol. 20, No. 5.
Stringer, S.M. et al., "Invariant Object Recognition in the Visual System with Novel Views of 3D Objects," Neural Computation, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, Artificial Intelligence Laboratory, Massachusetts Institute of Technology, Cambridge, MA, USA, eleven pages.
Thomson, A.M. et al., "Interlaminar Connections in the Neocortex," Cerebral Cortex, 2003, pp. 5-14, vol. 13, No. 1.
Thornton, J. et al., "Robust Character Recognition Using a Hierarchical Bayesian Network," Proceedings of the 19.sup.th Australian Joint Conference on Artifical Intelligence, 2006, pp. 1259-1264.
Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.
Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2.
U.S. Appl. No. 12/029,434, filed Feb. 11, 2008.
U.S. Appl. No. 13/218,170, filed Aug. 25, 2011.
U.S. Appl. No. 13/218,194, filed Aug. 25, 2011.
U.S. Appl. No. 13/218,202, filed Aug. 25, 2011.
U.S. Appl. No. 13/227,355, filed Sep. 7, 2011.
U.S. Appl. No. 13/333,865, filed Dec. 21, 2011.
U.S. Appl. No. 13/415,713, filed Mar. 8, 2012.
U.S. Appl. No. 13/604,543, filed Sep. 5, 2012.
U.S. Office Action, U.S. Appl. No. 11/010,243, dated Jul. 12, 2007, twelve pages.
U.S. Office Action, U.S. Appl. No. 11/147,069, dated Jan. 9, 2007, twenty-seven pages.
U.S. Office Action, U.S. Appl. No. 11/147,069, dated Jan. 9, 2009, thirty-eight pages.
U.S. Office Action, U.S. Appl. No. 11/147,069, dated Jul. 29, 2009, forty-three pages.
U.S. Office Action, U.S. Appl. No. 11/147,069, dated May 15, 2008, thirty-seven pages.
U.S. Office Action, U.S. Appl. No. 11/147,069, dated May 29, 2007, thirty-six pages.
U.S. Office Action, U.S. Appl. No. 11/147,069, dated Oct. 30, 2007, thirty-four pages.
U.S. Office Action, U.S. Appl. No. 11/351,437, dated Aug. 23, 2007, sixteen pages.
U.S. Office Action, U.S. Appl. No. 11/351,437, dated Feb. 20, 2008, six pages.
U.S. Office Action, U.S. Appl. No. 11/622,447, dated May 28, 2008, eighteen pages.
U.S. Office Action, U.S. Appl. No. 11/622,448, dated Apr. 30, 2008, seventeen pages.
U.S. Office Action, U.S. Appl. No. 11/622,448, dated Aug. 24, 2007, nineteen pages.
U.S. Office Action, U.S. Appl. No. 11/622,454, filed Jun. 3, 2008, thirteen pages.
U.S. Office Action, U.S. Appl. No. 11/622,454, filed Mar. 30, 2009, eleven pages.
U.S. Office Action, U.S. Appl. No. 11/622,455, dated Apr. 21, 2010, twelve pages.
U.S. Office Action, U.S. Appl. No. 11/622,456, dated Mar. 20, 2009, nine pages.
U.S. Office Action, U.S. Appl. No. 11/622,456, dated May 7, 2008, fourteen pages.
U.S. Office Action, U.S. Appl. No. 11/622,456, dated Nov. 6, 2008, seven pages.
U.S. Office Action, U.S. Appl. No. 11/622,457, dated Apr. 21, 2009, six pages.
U.S. Office Action, U.S. Appl. No. 11/622,457, dated Aug. 24, 2007, ten pages.
U.S. Office Action, U.S. Appl. No. 11/622,457, dated May 6, 2008, fourteen pages.
U.S. Office Action, U.S. Appl. No. 11/622,457, dated Nov. 20, 2008, eight pages.
U.S. Office Action, U.S. Appl. No. 11/622,458, dated Apr. 1, 2010, sixteen pages.
U.S. Office Action, U.S. Appl. No. 11/680,197, dated Mar. 23, 2010, twelve pages.
U.S. Office Action, U.S. Appl. No. 11/680,197, dated Sep. 14, 2010, seventeen pages.
U.S. Office Action, U.S. Appl. No. 11/713,157, dated Mar. 31, 2010, fourteen pages.
U.S. Office Action, U.S. Appl. No. 11/945,919, dated Sep. 7, 2010, nineteen pages.
U.S. Office Action, U.S. Appl. No. 12/029,434, dated Mar. 28, 2011, twenty-four pages.
U.S. Office Action, U.S. Appl. No. 12/029,434, dated Nov. 8, 2011, thirty-six pages.
U.S. Office Action, U.S. Appl. No. 12/039,630, dated Nov. 24, 2010, ten pages.
U.S. Office Action, U.S. Appl. No. 12/039,652, dated Mar. 29, 2011, fifteen pages.
U.S. Office Action, U.S. Appl. No. 12/040,849, dated Feb. 3, 2011, thirteen pages.
U.S. Office Action, U.S. Appl. No. 12/040,849, dated Jul. 1, 2011, eighteen pages.
U.S. Office Action, U.S. Appl. No. 12/147,348, dated Oct. 11, 2011, forty-three pages.
U.S. Office Action, U.S. Appl. No. 12/288,185, dated Sep. 15, 2010, eleven pages.
U.S. Office Action, U.S. Appl. No. 12/483,642, dated Apr. 26, 2012, twelve pages.
U.S. Office Action, U.S. Appl. No. 12/483,642, dated Aug. 10, 2012, seven pages.
U.S. Office Action, U.S. Appl. No. 12/751,808, dated Oct. 28, 2010, thirteen pages.
U.S. Office Action, U.S. Appl. No. 13/151,928, dated Aug. 2, 2011, eight pages.
U.S. Office Action, U.S. Appl. No. 13/218,170, dated Jul. 5, 2013, six pages.

(56) References Cited

OTHER PUBLICATIONS

U.S. Office Action, U.S. Appl. No. 13/218,194, dated Oct. 5, 2012, fourteen pages.
U.S. Office Action, U.S. Appl. No. 13/227,355, dated May 25, 2012, twenty-four pages.
U.S. Office Action, U.S. Appl. No. 13/333,865, dated May 16, 2012, twenty-four pages.
United States Office Action, U.S. Appl. No. 13/218,202, dated Feb. 3, 2014, eleven pages.
United States Office Action, U.S. Appl. No. 13/658,200, dated May 8, 2015, seventeen pages.
United States Office Action, U.S. Appl. No. 13/046,464, dated Apr. 6, 2015, 15 pages.
United States Office Action, U.S. Appl. No. 13/046,464, dated Apr. 9, 2014, 16 pages.
United States Office Action, U.S. Appl. No. 13/046,464, dated Jun. 19, 2013, 14 pages.
United States Office Action, U.S. Appl. No. 13/046,464, dated Nov. 28, 2014, 16 pages.
United States Office Action, U.S. Appl. No. 13/046,464, dated Oct. 16, 2013, 16 pages.
Van Essen, D.C. et al., "Information Processing Strategies and Pathways in the Primate Visual System," An Introduction to Neural and Electronic Networks, 1995, pp. 45-76.
Vaught, T.N., "Software Design in Scientific Computing," Jun. 23, 2008, Numenta HTM Workshop, Jun. 23-24, 2008, SRI Campus, Menlo Park, CA, thirty-two pages.
Vlajic, "Vector Quantization of Images Using Modified Adaptive Resonance Algorithm for Hierarchical Clustering," IEEE Transactions on Neural Networks, 2001, pp. 1147-1162, vol. 12, No. 5.
Weiss, R. et al., "HyPursuit: A Hierarchical Network Search Engine that Exploits Content-Link Hypertext Clustering," Proceedings of the Seventh Annual ACM Conference on Hypertext, Mar. 16-20, 1996, pp. 180-193, Washington, D.C., USA.
Wiskott, L. et al., "Slow Feature Analysis: Unsupervised Learning of Invariances," Neural Computation, 2002, pp. 715-770, vol. 14, No. 4.
Wu, G. et al., "Multi-camera Spatio-temporal Fusion and Biased Sequence-data Learning for Security Surveillance," Association for Computing Machinery, 2003, pp. 528-538.
Yedidia, J.S. et al., "Understanding Belief Propagation and its Generalizations," Joint Conference on Artificial Intelligence (IJCAI 2001), Aug. 4-10, 2001, Seattle, WA, USA, thirty-five pages.
Zayyani, H. et al., "Bayesian Pursuit Algorithm for Sparse Representation," 2009 IEEE International Conference on Acoustics, Speech and Signal Processing, ICASSP 2009, IEEE, 2009, pp. 1549-1552.
Zemel, R.S., "Cortical Belief Networks," Computational Models for Neuroscience, 2003, pp. 267-287, Hecht-Nielsen, R. et al., eds., Springer-Verlag, New York.
Zhang, R. et al., "Bayesian methodology for reliability model acceptance," Reliability Engineering & System Safety, 2003, pp. 95-103, vol. 80.

\* cited by examiner

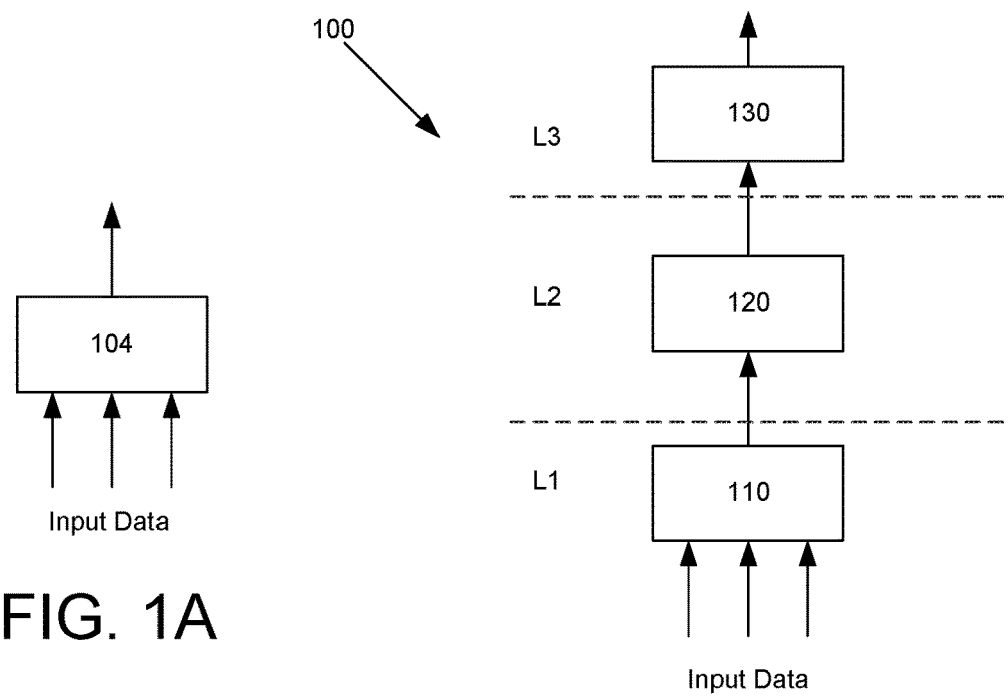
FIG. 1A
FIG. 1B
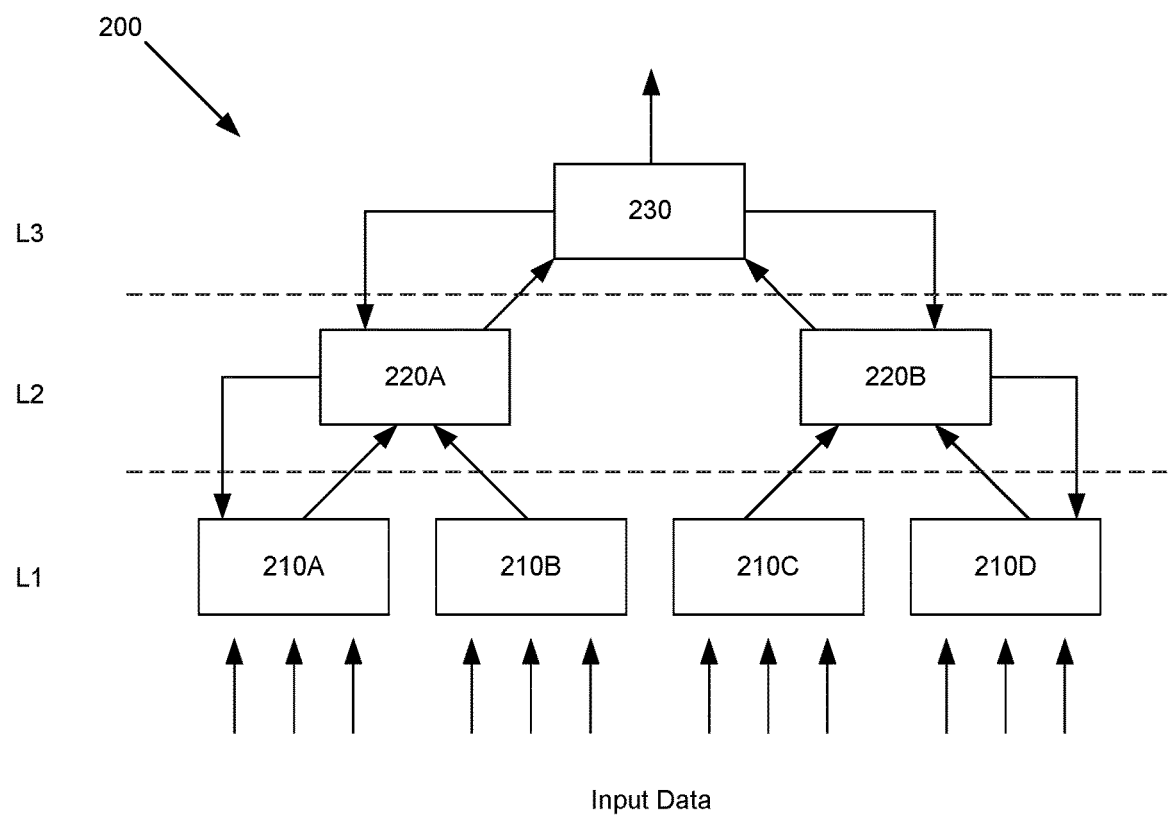
FIG. 2

Column Activation Signals

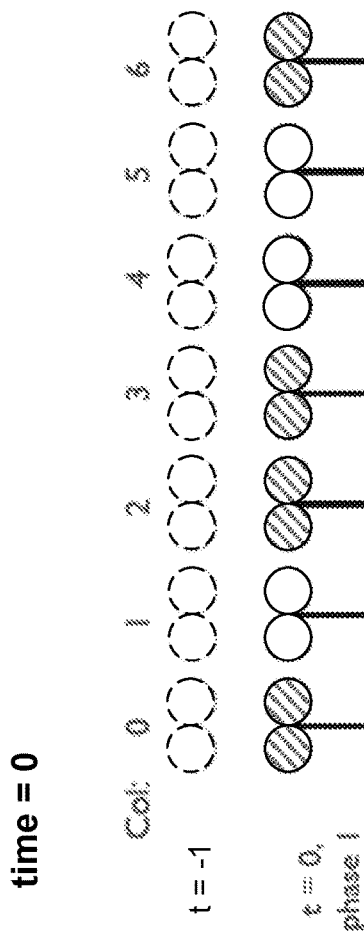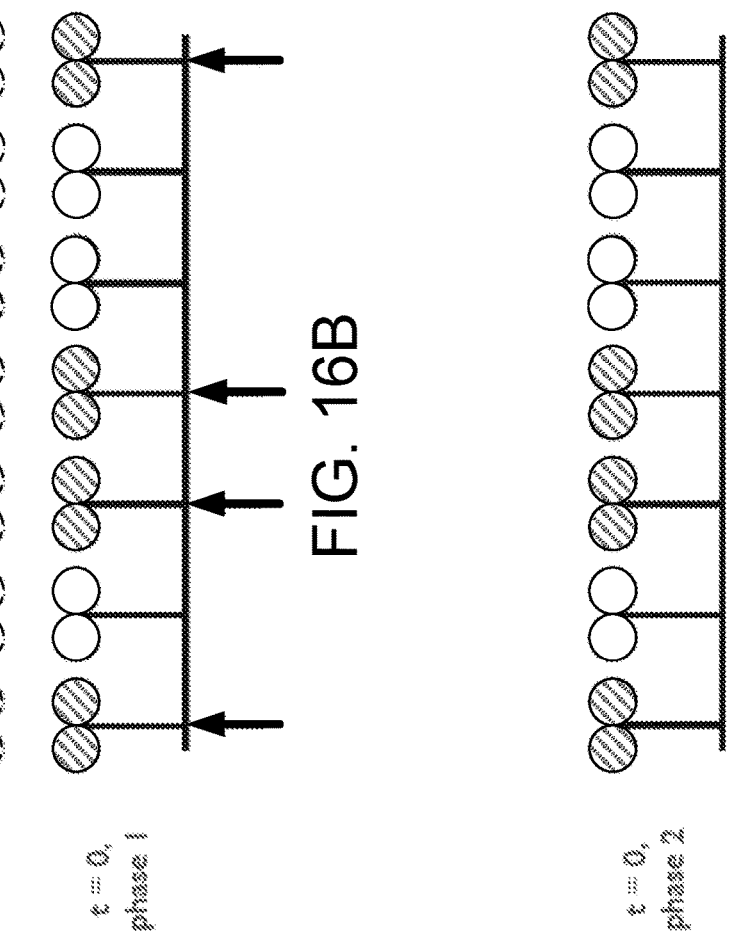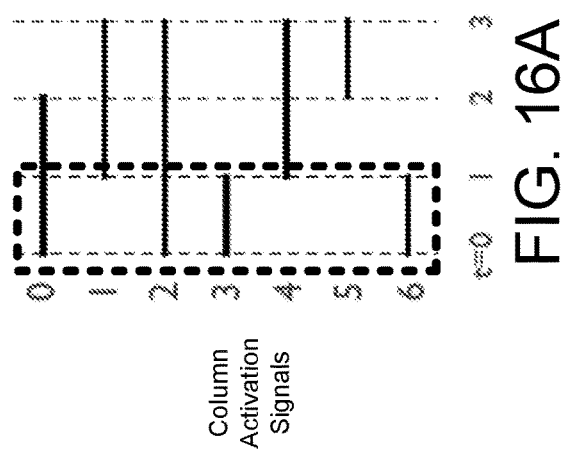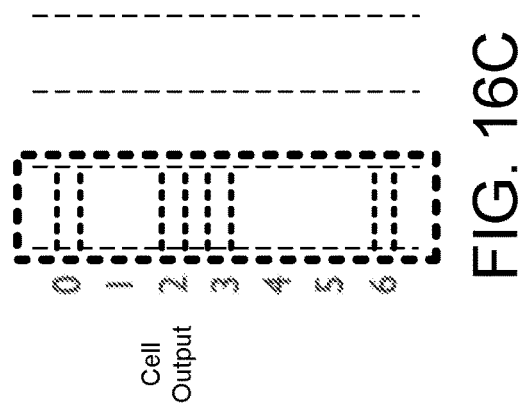

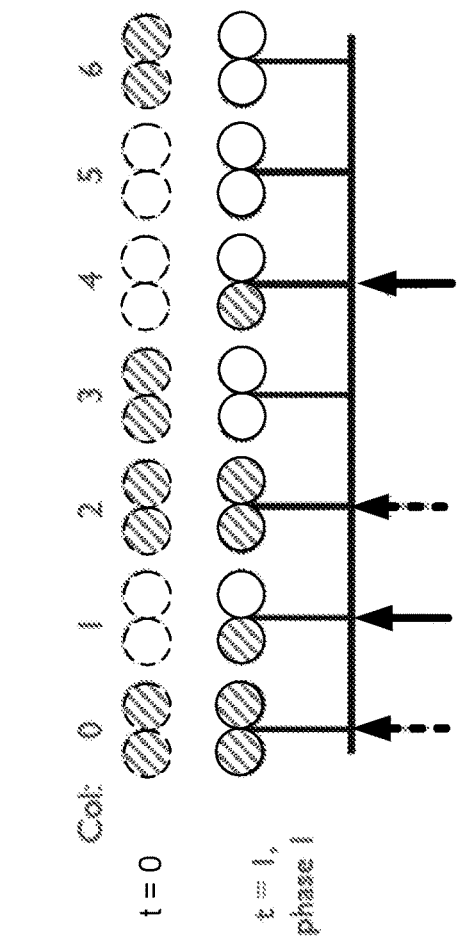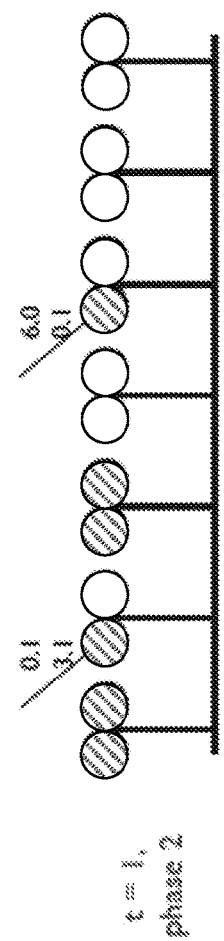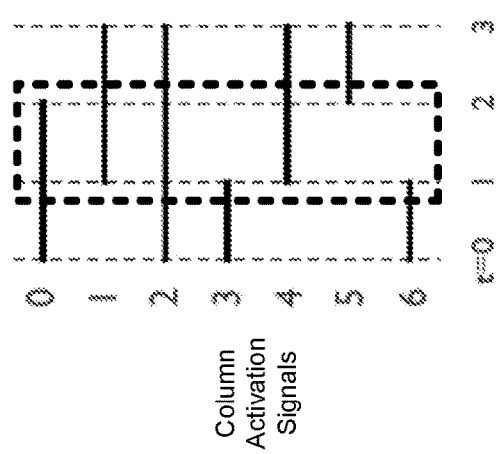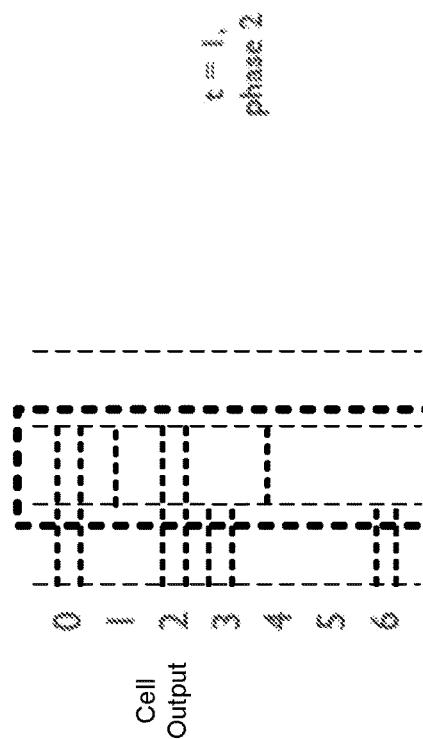
FIG. 17A
FIG. 17B
FIG. 17C
FIG. 17D time = 2 time = 4 (repeat of t = 0)

| A1 | A2 | B1 | B2 |
|----|----|----|----|
| A3 | A4 | B3 | B4 |
| C1 | C2 | D1 | D2 |
| C3 | C4 | D3 | D4 |

SPARSE DISTRIBUTED REPRESENTATION FOR NETWORKED PROCESSING IN PREDICTIVE SYSTEM

CROSS-REFERENCE TO RELATED APPLICATIONS

This application is a continuation-in-part application of U.S. patent application Ser. No. 16/291,862 filed on Mar. 4, 2019, which is a continuation of U.S. patent application Ser. No. 14/880,034 filed on Oct. 9, 2015 (issued as U.S. Pat. No. 10,275,720), which is a continuation of U.S. patent application Ser. No. 13/046,464 filed on Mar. 11, 2011 (issued as U.S. Pat. No. 9,189,745), which claims priority to U.S. Provisional Patent Application No. 61/314,096 filed on Mar. 15, 2010, U.S. Provisional Patent Application No. 61/381,886 filed on Sep. 10, 2010, and U.S. Provisional Patent Application No. 61/411,665 filed on Nov. 9, 2010, which are incorporated by reference herein in their entirety.

BACKGROUND

1. Field of the Disclosure

The present invention relates to learning and processing spatial patterns and temporal sequences in a temporal memory system, and more specifically to using a sparse distributed representation to learn and process spatial patterns and temporal sequences in a temporal memory system.

2. Description of the Related Arts

Hierarchical Temporal Memory (HTM) systems represent a new approach to machine intelligence. In an HTM system, training data comprising temporal sequences and/or spatial patterns are presented to a network of nodes. The HTM network then builds a model of the statistical structure inherent to the spatial patterns and temporal sequences in the training data, and thereby learns the underlying 'causes' of the temporal sequences of patterns and sequences in the training data. The hierarchical structures of the HTM system allow them to build models of very high dimensional input spaces using reasonable amounts of memory and processing capacity.

The training process of the HTM system is largely a form of unsupervised machine learning. During a training process, one or more processing nodes of the HTM system form relationships between temporal sequences and/or spatial patterns present in training input and their associated causes or events. During the learning process, indexes indicative of the cause or events corresponding to the training input may be presented to the HTM system to allow the HTM system to associate particular categories, causes or events with the training input.

Once an HTM system has built a model of a particular input space, it can perform inference or prediction. To perform inference or prediction, novel input including temporal sequences or spatial patterns are presented to the HTM system. During the inference stage, each node in the HTM system produces an output that is more invariant and temporally stable than its input. That is, the output from a node in the HTM system is more abstract and invariant compared to its input. At its highest node, the HTM system will generate an output indicative of the underlying cause or event associated with the novel input.

SUMMARY

Embodiments relate to a processing node for learning and storing temporal sequences of spatial patterns in an input signal. The processing node may learn and store relationships between spatial patterns or temporal sequences of spatial patterns. The learning and storing of relationships or temporal sequences are performed autonomously in a manner that is robust against noise in the input signal. Based on the stored relationships, the processing node may process a subsequent input signal and generate an output that may represent prediction, identity of sequences of spatial patterns or other useful information.

In one embodiment, the processing node may learn temporal sequences of different lengths. The processing node may also learn temporal sequences while performing inference, prediction or other processing based on the stored relationships or temporal sequences.

In one embodiment, the processing system includes a spatial pooler that generates a spatial pooler signal representing similarity between received spatial patterns in the input signal and stored co-occurrence patterns. The spatial patterns may be represented by a combination of elements that are active or inactive. The spatial pooler determines the extent to which each co-occurrence pattern overlaps with active elements in the input signal, chooses a subset of co-occurrence patterns that match closely with the active elements, and generates the spatial pooler signal in sparse distributed representation to indicate which stored co-occurrence patterns closely match spatial patterns in the input signal.

In one embodiment, the spatial pooler includes a plurality of co-occurrence detectors. Each co-occurrence detector detects a spatial pattern in the input signal and produces a score representing how close the spatial pattern matches a stored co-occurrence pattern. Based on scores produced by the co-occurrence detectors, the spatial pooler selects co-occurrence detectors. The spatial pooler signal indicates which co-occurrence detectors are selected.

In one embodiment, distances are set between the co-occurrence detectors. The spatial pooler enforces local inhibition of selection co-occurrence detectors that are within a predetermined distance from a selected co-occurrence detector. Alternatively, the spatial pooler uses a global inhibition function to select a set of co-occurrence detectors that most closely match the spatial patterns.

In one embodiment, the processing node includes a sequence processor receiving and processing the signal from the spatial pooler to learn, recognize and predict temporal sequences in the input signal. The sequence processor includes one or more columns, each column including one or more cells. A subset of columns may be selected by the spatial pooler signal, causing one or more cells in these columns to activate. When a cell activates, activation states of some other cells in the same node and/or level are detected and stored. By collectively storing the cell activation states in different cells, the sequence processor may store temporal sequences in the input signal.

In one embodiment, each cell includes one or more temporal memory segments. Different temporal memory segments in the cell store different cell activation states at different times. The sequence processor may activate a cell when the activation states of other cells correspond to cell activation states stored in a temporal memory segment of the cell.

In one embodiment, the sequence processor outputs an output signal representing currently activated cells in the processing node. The output signal may be fed to a spatial pooler of a parent processing mode in a hierarchy of processing nodes.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 1A is a conceptual diagram of a single processing node in a non-hierarchical system, according to one embodiment.

FIG. 1B is a conceptual diagram illustrating a Hierarchical Temporal Memory (HTM) system including three layers of processing nodes, according to one embodiment.

FIG. 2 is a conceptual diagram illustrating an HTM system with multiple processing nodes at lower levels, according to one embodiment.

FIGS. 16A through 20D are diagrams illustrating an example process of learning cell activation states and performing inference, according to one embodiment.

DETAILED DESCRIPTION OF EMBODIMENTS

Figure 3A:
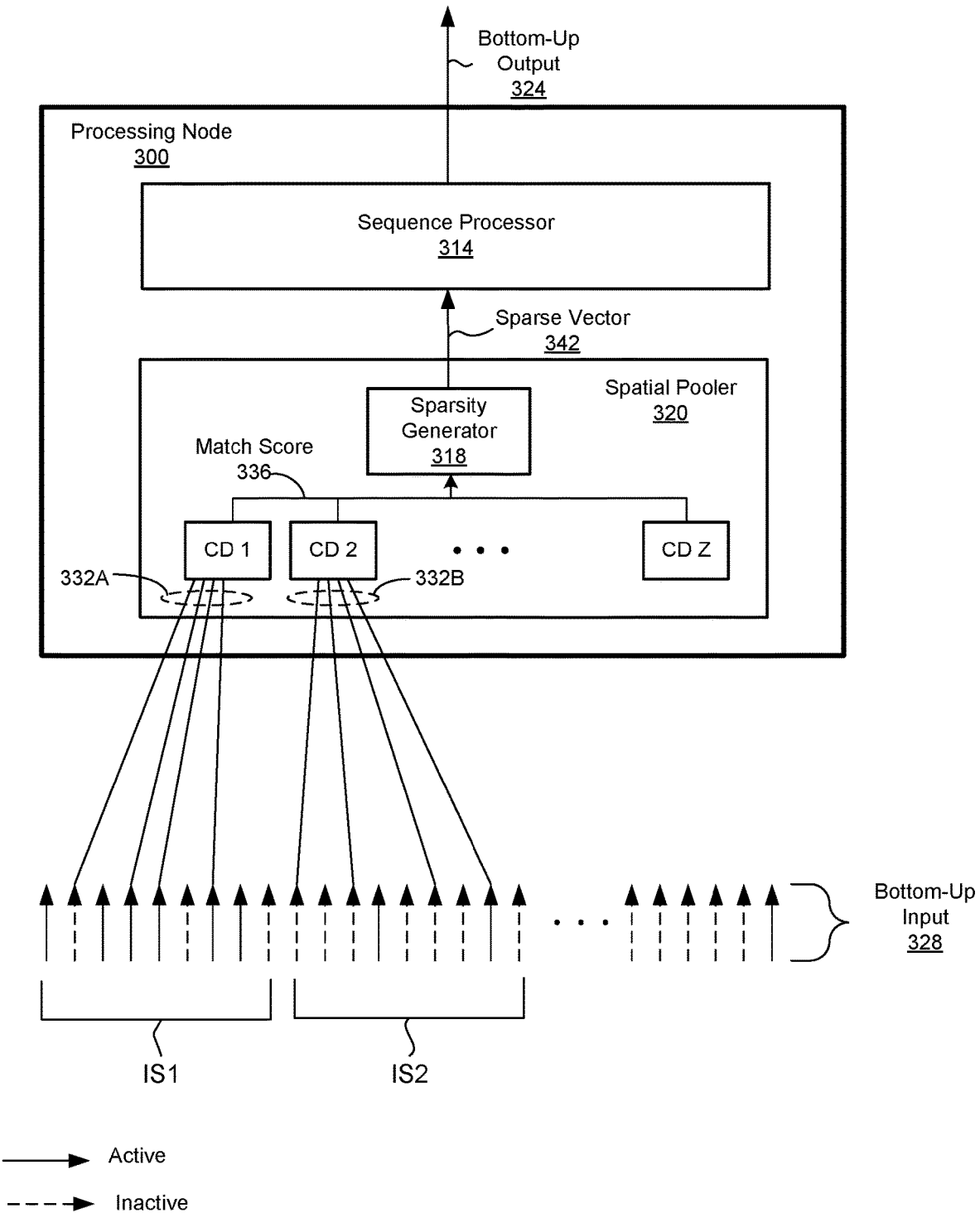
FIG. 3A is a block diagram illustrating a processing node of an HTM system, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, embodiments are not described with reference to any particular programming language. It will be appreciated that a variety of programming languages may be used to implement the teachings as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to a processing node for detecting, learning and predicting spatial patterns and temporal sequences of such spatial patterns by representing detected spatial patterns in sparse distributed representation. The sparse distributed representation enables abstraction and generalization of spatial patterns as well as reducing memory requirements for detecting a large number of spatial patterns. Temporal sequences of the detected spatial patterns are learned by storing temporal relationships of the detected spatial patterns. The temporal relationships may be stored in cells that are organized into columns.

Architecture of Temporal Memory System

A temporal memory system stores temporal relationships in sequences of spatial patterns and generates useful information based on the stored relationships. The useful information may include, for example, prediction of spatial patterns to be received, identification of spatial patterns or a higher level cause associated with the spatial patterns in input data. The temporal memory system may be of a non-hierarchical structure or be of a hierarchical structure.

FIG. 1A is a conceptual diagram of a single processing node 104 in a non-hierarchical system. The processing node 104 receives input data, processes temporal sequences in the input data and generates an output. The output of the processing node 104 is based on the temporal relationships between spatial patterns. For example, the output may indicate prediction on what spatial patterns are to follow or indicate how well the prediction matched a subsequent spatial pattern in the input data.

FIG. 1B is a conceptual diagram of processing nodes organized in a hierarchical manner. Such hierarchically structured temporal memory system is referred to as a Hierarchical Temporal Memory (HTM) system. In an HTM system, multiple processing nodes learn, predict and infer input at different levels of abstraction. An example HTM system 100 of FIG. 1B comprises three levels where each level L1, L2 and L3 includes one processing node 110, 120 and 130, respectively. HTM system 100 has three levels L1, L2, L3, with level L1 being the lowest level, level L3 being the highest level, and level L2 being an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

Each processing node 110, 120, 130 may perform spatial pooling and/or temporal processing, as described below in detail with reference to FIG. 4. As a result, the output signals from each processing node 110, 120, 130 are more abstract or invariant over time compared to their input signals. In one embodiment, the top node 130 generates a final output of HTM system 100 that is of the highest abstraction (e.g., likely causes or events) among the outputs generated in HTM system 100. The final output may include distributions indicating likelihood that certain causes or events are associated with the sensed input.

Some of many functions performed by a processing node include, for example, spatial pooling and temporal processing. The spatial pooling herein refers to the process of mapping a set of distinct but similar spatial patterns into a spatial co-occurrence. The temporal processing may include, but is not limited to, learning temporal sequences, performing inference, recognizing temporal sequences, predicting temporal sequences, labeling temporal sequences and temporal pooling. The learning of temporal sequences herein refers to one or more of initializing, expanding, contracting, merging and splitting temporal sequences. The prediction herein refers to assessing likelihood that certain spatial patterns will appear subsequently in the input data. The temporal pooling herein refers to processing input data to provide an output that is more stable and invariable over time compared to spatial patterns in the input data. Hardware, software, firmware or a combination thereof for performing the spatial pooling is hereinafter referred to as a spatial pooler. Hardware, software, firmware or a combination thereof for performing the temporal processing is hereinafter referred to as a sequence processor. The sequence processor may perform one or more of learning temporal sequences, performing inference, recognizing temporal sequences, predicting temporal sequences, labeling temporal sequences and temporal pooling.

In one embodiment, a processing node includes only a sequence processor or the spatial pooler. For example, nodes at the first level of the HTM system may consist of processing nodes having only spatial poolers, and the nodes at the second level of the HTM system may consist of processing nodes having only sequence processors. Processing nodes performing other functions (e.g., filtering) may also be placed within the HTM system. Alternatively, a processing node may include two or more levels of interconnected sequence processors or spatial poolers.

The processing nodes of the HTM system may be arranged so that the number of processing nodes decreases as level increases. FIG. 2 is a diagram illustrating HTM system 200 having three levels L1, L2, L3, with level L1 being the lowest level, level L3 being the highest level, and level L2 being an intermediate level between levels L1 and L3. HTM system 200 is hierarchically structured so that the processing nodes cover a larger input space as the level ascends. Level L1 has nodes 210A, 210B, 210C and 210D; level L2 has nodes 220A and 220B; and level L3 has node 230. Nodes 210A, 210B, 210C, 210D, 220A, 220B, and 230 are hierarchically connected in a tree-like structure such that each processing node has several children nodes (that is, nodes connected at a lower level) and one parent node (that is, node connected at a higher level).

Further, HTM system 200 propagates bottom-up signals up the hierarchy as well as propagates top-down signals down the hierarchy. That is, each processing node 210A, 210B, 210C, 210D, 220A, 220B, and 230 may be arranged to (i) propagate information up the HTM hierarchy to a connected parent node, and (ii) propagate information down the HTM hierarchy to any connected children nodes.

The number of levels or arrangement of processing modes in FIGS. 1 and 2 are merely illustrative. Many variants of HTM system may be developed and deployed depending on the specific application. For example, the number of levels may be increased to provide different levels of abstraction/invariance or to accommodate different types of sensed inputs (e.g., visual data and audio data). Further, a parent node may also receive partially overlapping bottom-up signals from multiple children nodes. An external supervision signal may also be fed to each of the processing nodes to enhance spatial and/or temporal processing performance.

In one embodiment, one or more nodes of the temporal memory system receives sensed inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The temporal memory system may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, predicted inventory, predicted energy usage in a building or facility, web analytics (e.g., predicting which link or advertisement that users are likely to click), identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments. The underlying representation (e.g., photo, audio and etc.) can be stored in a non-transitory storage medium.

Structure of Example Processing Node and Overall Process

FIG. 3A is a block diagram illustrating processing node 300 in a temporal memory system, according to one embodiment. The processing node 300 may be a stand-alone node for operating without other processing nodes. Alternatively, the processing node 300 may be part of a hierarchy of processing nodes, for example, as described above in detail with reference to FIGS. 1 and 2. Processing node 300 may include, among other components, sequence processor 314 and spatial pooler 320. Spatial pooler 320 receives bottom-up input 328, performs spatial pooling, and sends sparse vector 342 in a sparse distributed representation to sequence processor 314. The sparse vector 342 includes information about patterns detected in the bottom-up input 328. For a processing node at the lowest level, the bottom-up input 328 may be sensed input. For processing nodes at intermediate and top levels, the bottom-up input 328 may be a bottom-up output from a child node or children nodes. The spatial pooling is described below in detail with reference to FIG. 5B.

Sequence processor 314 receives sparse vector 342, performs temporal processing and generates bottom-up output 324. The bottom-up output 324 represents information on temporal sequences detected or predicted in the spatial patterns of the bottom-up input 328. The temporal processing is described below in detail with reference to FIG. 10. Bottom-up output 324 is fed to a parent node, which may have a similar or the same structure as processing node 300.

Figure 4:
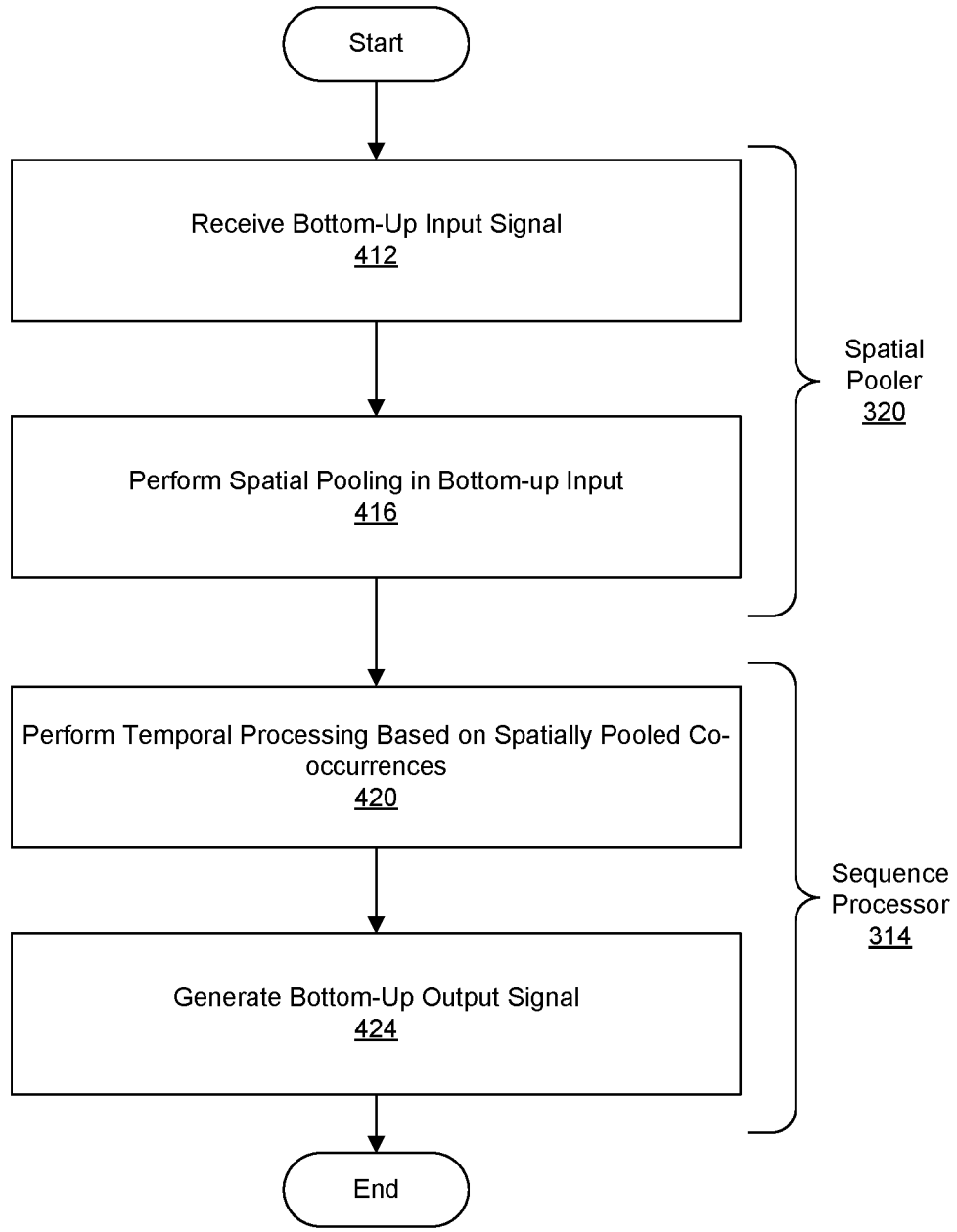
FIG. 4 is a flowchart illustrating an overall process in a processing node of an HTM system, according to one embodiment.

FIG. 4 is a flowchart illustrating an overall process at processing node 300, according to one embodiment. Spatial pooler 320 receives 412 bottom-up input 328. Then spatial pooler 320 performs 416 spatial pooling for co-occurrences detected in bottom-up input 328, as described below in detail with reference to FIG. 5A. As a result, spatial pooler 342 generates sparse vector 342 that is sent to sequence processor 314.

Sequence processor 314 receives sparse vector 342 and performs 420 temporal processing based on spatially pooled co-occurrences, as described below in detail with reference to FIG. 10. Sequence processor 314 then generates 424 bottom-up output 324 that is sent to a parent node.

The process described in FIG. 4 is merely illustrative. Various additional steps may be added, and certain steps may be omitted from the step depending on the structure and function of the processing nodes.

Spatial Pooling Using Local Inhibition

Spatial pooler 320 performs spatial pooling by producing sparse vector 342 in sparse distributed representation. In sparse distributed representation, a number of elements in the sparse vector 342 are inactive (e.g., assigned a value of zero) while the remaining elements are active (e.g., assigned a value of one). For example, sparse vector 342 may have approximately 10% of its elements active while approximately 90% of its elements are inactive. The percentage of active elements may be fixed (i.e., fixed-sparsity representation) or the percentage of active elements may change over time.

Distinct spatial patterns may be represented in various representation forms such as fully distributed representation, sparse distributed representation and sparse place code (also known as "grandmother code"). When the same number of bits is used, fully distributed representation can represent the largest number of spatial patterns, followed by sparse distributed representation. A sparse place code can represent the least number of patterns. For example, when using 500 bits, a fully distributed representation is capable of representing $2^{500}$ (approximately $3.27 \times 10^{150}$) different spatial patterns. sparse distributed representation with same number of bits and 450 inactive elements, for example, is capable of representing the number of ways 50 elements can be selected from a total of 500 (approximately $2.31 \times 10^{69}$) different patterns. With 500 bits, a sparse place code can represent only 500 spatial patterns.

Although sparse distributed representations can represent a limited number of spatial patterns compared to fully distributed representations, sparse distributed representations can still represent a large number of distinct spatial patterns as long as the vector has a sufficient portions of elements (e.g., above 200 elements) and certain portion of inactive (or active) elements (e.g., 1 to 10%). Further, representing sparse distributed representation has numerous advantages that are beneficial to spatial pooling.

One of such numerous advantages is that sparse distributed representations allow effective identification of similar or common spatial patterns. Vectors of spatial patterns in sparse distributed representations are likely to have a small number of shared bits that depends on the size of the vector and the number of active elements. For example, in the case of using a 500 bit vector with 450 inactive elements, different spatial patterns overlap by about 5 bits. The number of overlapping bits in two sparse distributed representation vectors is correlated with shared commonality (e.g., shared characteristics or meaning) between the spatial patterns corresponding to the sparse distributed representation vectors. That is, the increased number of overlapping bits (even small increase) in the vectors in sparse distributed representation indicates that the spatial patterns corresponding to the spatial patterns are more likely to share some characteristics or meaning. Hence, a processing node can effectively identify similarity or commonality between spatial patterns by comparing the overlap in bits of vectors in sparse distributed representation.

The capability of sparse distributed representations to represent similarity or commonality in characteristics or meaning via shared active elements also affords the processing node capability to generalize to new spatial patterns. Learning in sparse distributed representations occurs mostly at the level of active elements, which are shared among different representations. Therefore after sufficient learning on a diverse set of patterns, all the elements will have been undergone learning. A novel set of inputs will be represented by a set of elements that are shared with the previous learning patterns. The novel patterns will inherit this learning. Hence, a temporal memory system can take advantage of sparse distributed representation to represent similarity or commonality between the spatial patterns to anticipate or predict spatial patterns that the temporal memory system was not previously exposed to.

Another advantage of the sparse distributed representation is that it affords robust performance against noise in inputs and processing. Because all representations are composed of many active elements and because each active element is linked to only a small subset of the other elements, substantial errors and noise can be introduced which affects only a small portion of the representation. Therefore, a processing node using vectors in sparse distributed representations tends to show superior performance for noisy inputs and errors in processing.

Vectors in sparse distributed representations are also advantageous because they allow scalar values to be represented in a set of binary values that are amenable to processing by the temporal memory system.

The size of vector and the number of active elements in sparse distributed representations should be configured to take advantage of such advantageous characteristics of sparse distributed representations. If the size of a vector in sparse distributed representation is too small, only a small number of spatial patterns can be represented by the vector. The size of the vector for representing the spatial patterns in a temporal memory system is preferably larger than 100 bits, and more preferably larger than 200 bits. The size of the vector should not be too large because the increased size of vector requires additional more memory and computation capacity. The upper limit of the vector size depends on the number of spatial patterns and the application. In the example of visual recognition, the vector is preferably smaller than 20 Kbits and more preferably smaller than 10 Kbits. The size of vector is not restrictive, and vectors smaller than 100 bits or 200 bits or larger than 10 Kbits or 20 Kbits can also be used.

Desirable percentage of active (or inactive) elements in the vector (i.e., the density) depends on many factors. Generally, the percentage of active (or inactive) elements is preferably in the range between 1% to 50%, and more preferably in the range between 1% and 10%. The percentage of active (or inactive) elements is not restrictive; and, active (or inactive) elements may take up less than 1% or more than 10%.

Spatial pooling is the process of grouping similar spatial patterns and representing these spatial patterns using a single vector. Taking an example of processing input data for 100×100 input space (i.e., 10,000 elements), the total number of unique spatial patterns is $2^{10,000}$. Assume that each element of the input data is binary (i.e., zero or one). If a 500 bit vector in sparse distributed representation with 450 inactive elements (10% density) are used to represent all spatial patterns from such input space, different spatial patterns must be assigned to the same vector because $2^{10,000}$ (equals $8.23 \times 10^{180}$) is larger than the number of ways 50 elements can be selected from a total of 500 ($2.31 \times 10^{69}$). In this example, the spatial pooling is the process of representing $2^{10,000}$ possible spatial patterns by a smaller number of groups (equal or less than the number of ways 50 elements can be selected from a total of 500) of spatial patterns.

Referring to FIG. 3A, spatial pooler 320 includes, among other components, a sparsity generator 318 and a plurality of co-occurrence detectors (CDs) 1 through Z. CDs detect co-occurrences in bottom-up input 328, and generate match scores 336. Match scores 336 indicate the degree of match between a spatial pattern of the bottom-up input 328 and a co-occurrence pattern associated with each CD. In one embodiment, a higher match score indicates more overlap between bottom-up input 328 and the associated co-occurrence pattern of each CD. The match scores 336 are provided to sparsity generator 318. In response, sparsity generator 318 generates sparse vector 342 in sparse distributed representation.

In one embodiment, each CD is mapped to a subset of elements in the bottom-up input 328 within predefined input space. As illustrated in FIG. 3A by lines extending from CD 1 to a subset of arrows of bottom-up input 328, CD 1 is mapped to receive a subset 332A of elements of the bottom-up input 328 within input space IS1. Similarly, CD 2 is mapped to receive a subset of elements of the bottom-up input 328 within input space IS2. Although illustrated in FIG. 3A as one-dimension for the sake of simplification, the input space (e.g., IS1, IS2) may consist of two or more dimensions.

The input space of each CD may be mutually exclusive or may partially overlap. Also, each CD may be mapped to receive the same number of input elements or a different number of input elements. Each input element could be binary or contain scalar values. In one embodiment, CDs are arranged to have topological relationships to their input space. For example, adjacent CDs cover adjacent portions of input space.

Figure 5A:
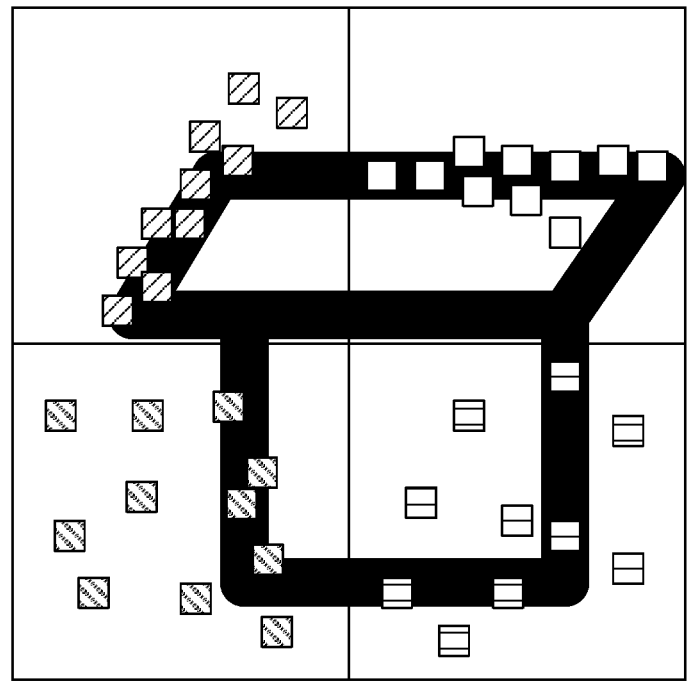
FIG. 5A is a diagram illustrating matching co-occurrences for a sensory input, according to one embodiment.

FIG. 5A is a diagram illustrating matching co-occurrences for sensed input, according to one embodiment. In this example, processing node 300 receives spatial patterns corresponding to images of various objects or features. The entire sensory input space is 100×100 pixels, and consists of four blocks, each having 50×50 pixels. Each pixel has a binary value of one or zero. CD 1 is mapped to receive input for elements represented by small diagonally hashed boxes (a total of 10 boxes) sampled from a top left input space block. CD 2 is mapped to receive input for elements represented by small white boxes (a total of 10 boxes) sampled from a top right input space block. CD 3 is mapped to receive input for elements represented by small diagonally hashed boxes (a total of 10 boxes) sampled from a bottom left input space block. CD 4 is mapped to receive input for elements sampled represented by small horizontally hashed boxes (a total of 10 boxes) from a bottom right input space block. For a spatial pattern (black lines) in FIG. 5A, seven elements mapped to CD 1 are active, nine elements mapped to CD 2 are active, four elements mapped to CD 3 are active and four elements mapped to CD 4 are active. Hence, the match scores for CD 1, CD 2, CD 3 and CD 4 are assigned, 7, 9, 4 and 4, respectively.

FIG. 5A illustrates an example where at least CD 1 and CD 2 are trained or conditioned to recognize certain features of a spatial pattern. CD 1 is trained or conditioned to detect a diagonal line feature (hence, input elements mapped to CD 1 are arranged in diagonal direction), and CD 2 is trained or conditioned to detect horizontal line feature (hence, input elements mapped to CD 2 are arranged in horizontal direction). CD 3 and CD 4 are each mapped to a random pattern.

Referring back to FIG. 3A, sparsity generator 318 collects the match scores 336 from the CDs, selects a number of CDs satisfying conditions based on their match scores and match scores of nearby CDs to generate sparse vector 342. In one embodiment, when a CD becomes dominant (i.e., the CD has a high match score), the CD inhibits selection of other CDs within a predetermined range (hereinafter referred to as "an inhibition range"). The inhibition range may extend only to CDs immediately adjacent to the dominant CD or may extend to CDs that are separated from the dominant CD by a predetermined distance. Alternatively, sparsity generator 318 may select a subset of CDs with highest match scores among all CDs in the processing node.

In one embodiment, the inhibition range of processing nodes increases at a higher level of the HTM system compared to the inhibition range of processing nodes at a lower level of the HTM system. The inhibition ranges of the processing nodes may be set so that the densities of the sparse vectors in the processing nodes at different levels are the same or within a predetermined range. The processing nodes at a higher level cover a larger range of input space compared to the processing nodes at a lower level. Hence, in order to achieve the same level of density across different levels of processing nodes, the inhibition range for processing nodes should be increased as the level ascended in the hierarchy.

In one embodiment, a greedy winner selection algorithm is used to select the dominant CD. In this algorithm, the CD with the highest match score is first selected. Then CDs within the inhibition range are excluded from selection. From the remaining CDs, the CD with the next highest match score is then selected. Again, CDs within the inhibition range of the CD with the next highest score are excluded. The process is repeated until all the CDs are either selected or excluded.

In one embodiment, the match scores are preprocessed before performing the greedy winner selection algorithm. The preprocessing may be performed for various reasons, including but not limited to: (i) remove noise, (ii) allow selection of a CD having a globally high match score but within the inhibition range of a CD with a higher match score, (iii) prevent or alleviate propagation of an initial condition (i.e., reduce the effect of initially selected CD on the overall selection of the CDs), and (iv) maintain the density of vectors within a range even over different ranges of input space.

In one embodiment, a convolution max function is used for preprocessing the match scores. The convolution max algorithm involves computing an intermediate value y(i) for $i^{th}$ CD by the following equation:

$$y(i)=x(i)-\max(x_{n1},x_{n2},\ldots,x_{nn}) \quad \text{Equation (1)}$$

where x(i) represents the match score for $i^{th}$ CD, and $x_{n1}$, $x_{n2}, \ldots, x_{nn}$ represent match scores of CDs in the inhibition range of $i^{th}$ CD. After the processing, the greedy selection algorithm is performed by selecting CDs with y(i) values larger than a selection threshold value. In this example, the selection threshold value may be 0 or any other value smaller than zero. As the selection threshold value becomes smaller, more CDs that have lower match scores than a dominant CD and within the inhibitory range of the dominant CD are selected despite the dominant CD. By selecting other CDs within the inhibitory range of the dominant CD, the overall selection of CDs (as represented by sparse vector 342) becomes more stable and less sensitive to the initial condition or changes in a small number of dominant CDs.

In an example of sparse vector 342, elements corresponding to the chosen CDs are indicated as being active, and elements corresponding to unselected CDs are indicated as being inactive. Assume that the spatial pooler includes 10 CDs of which the first CD and the fourth CD were selected for high match scores. In this example, the sparse vector may be (1, 0, 0, 1, 0, 0, 0, 0, 0, 0) where the first and fourth elements are one but other elements are zero. The density of the spatial vector representing the ratio of selected CDs among all CDs is governed by the inhibition range and the selection threshold value (the density of sparse vector 342 increases as the as the percentage of selected CDs increases). As the inhibitory range of a dominant CD increases, the density of the sparse vector 342 decreases. Further, as the selection threshold value increases, the density of the sparse vector increases. Conversely, as the inhibitory range of a dominant CD decreases, the density of the sparse vector 342 increases. Also, as the selection threshold value decreases, the density of the sparse vector 342 decreases. The combination of inhibitory range and the selection threshold value maintains the density of sparse vector 342 within a certain range. Alternatively, a fixed number of CDs may be selected from all CDs based on the match scores (e.g., a certain number of CDs with highest match scores).

When a new spatial pattern is presented, the match scores from the CDs may be updated accordingly. The updated match scores may prompt changes in sparse vector 342. In one embodiment, sparsity generator 318 implements hysteresis by retaining a previously chosen CD in the top CDs until a competing CD has a match score exceeding the match score of the chosen CD by a threshold point (e.g., 20% higher points). In this way, the sparse vector becomes more stable over time and more robust to noise.

Figure 5B:
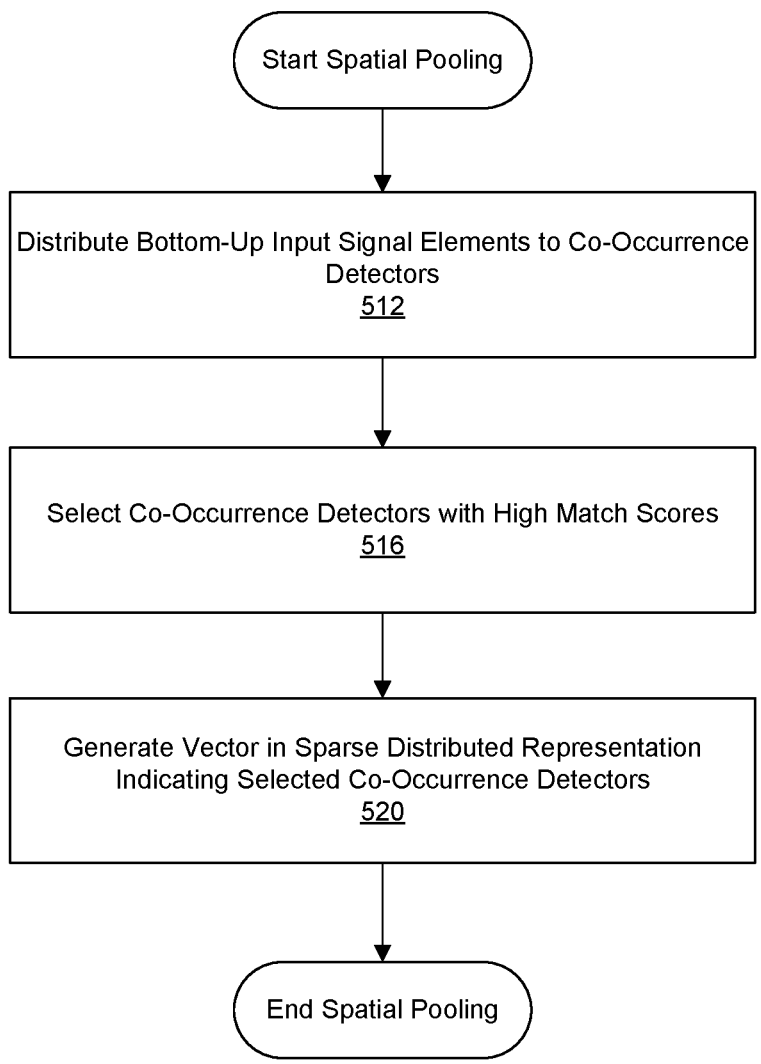
FIG. 5B is a flowchart illustrating a method of performing spatial pooling in a processing node, according to one embodiment.

FIG. 5B is a flowchart illustrating a method of performing spatial pooling in processing node 300, according to one embodiment. First, the elements of bottom-up input 328 are sent 512 to CDs according to the mappings between the input elements of the bottom-up input 328 and CDs.

Each CD then generates a match score indicating the extent to which a co-occurrence pattern associated with the CD matches the received input elements. Based on the match scores 336 from CDs, sparsity generator 318 selects 516 CDs that have high match scores 336. In selecting the CDs, local inhibition may be employed to partially or entirely exclude CDs within an inhibition range of a dominant CD. As a result of the selection, a subset of CDs is selected from the entire CDs (e.g., 50 CDs are selected from a total of 500 CDs). Sparsity generator 318 then generates 520 sparse vector 342 in sparse distributed representation to indicate the selected CDs.

Since each sparse vector may represent one or more spatial patterns, the spatial pooling achieves abstraction and generalization in spatial domain. Sparse vector 342 that changes over time is then provided to sequence processor 314 to perform abstraction and generalization in temporal domain, as described below with reference to FIG. 10.

Structure of Example Processing Node in Predictive System

Figure 3B:
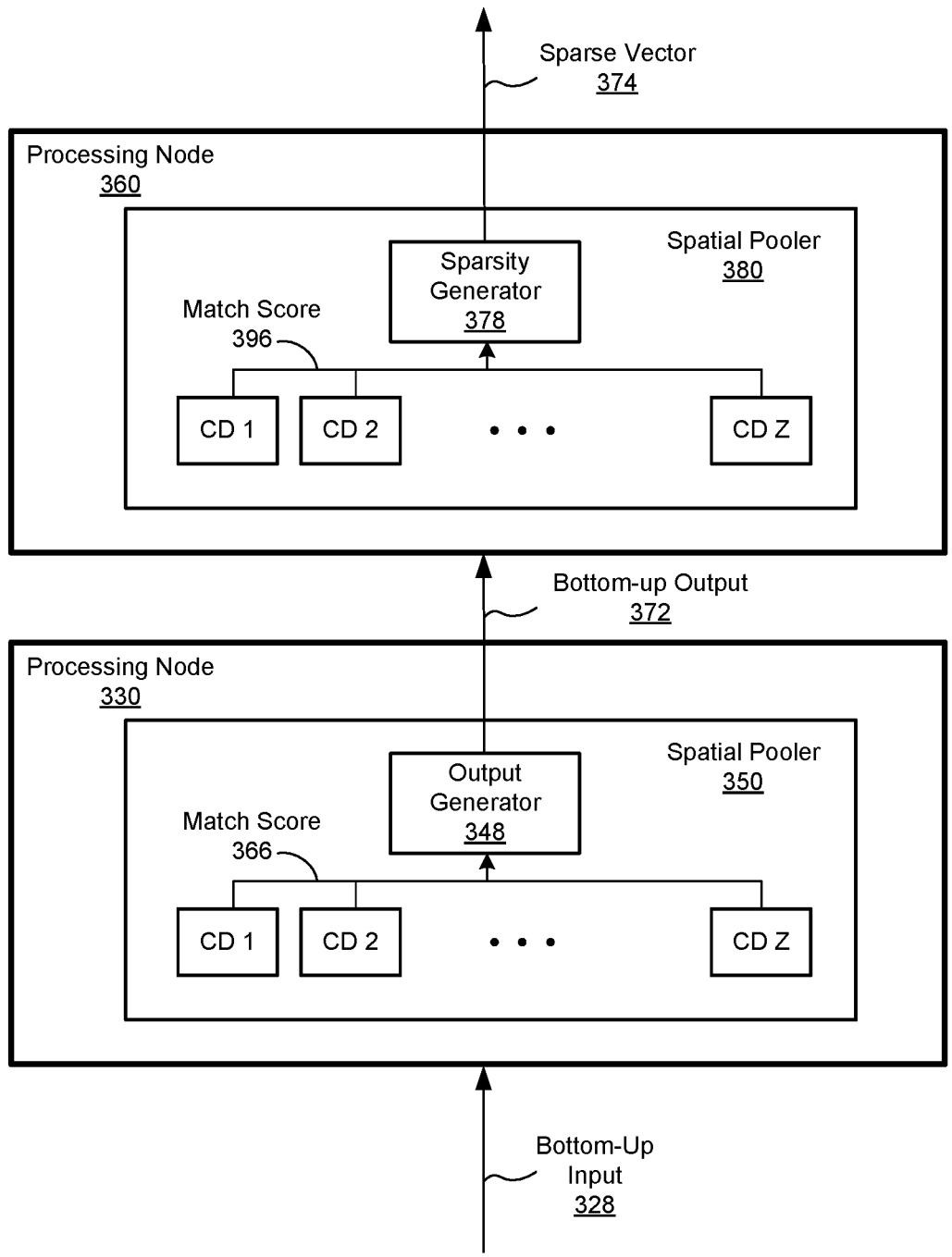
FIG. 3B is a block diagram illustrating processing nodes in a predictive system, according to one embodiment.

FIG. 3B is a block diagram illustrating processing nodes 330, 360 in a predictive system, according to one embodiment. The processing nodes 330, 360 may be part of a set of processing nodes, for example, of a neural network. The neural network receives input data and generates inference data by propagating the input data through the set of processing nodes of the neural network. The inference data represents inference or predictions made on the input data.

Processing node 330 may include, among other components, spatial pooler 350. Spatial pooler 350 receives bottom-up input 328 and generates bottom-up output 372. Similarly, processing node 360 may include, among other components, spatial pooler 380. The spatial pooler 380 receives bottom-up output 372 from previous processing node 330, performs spatial pooling, and generates sparse vector 374 in sparse distributed representation. The structure and functionalities of the spatial pooler 380 may be substantially similar to that of spatial pooler 320, except that the spatial pooler 380 of processing node 360 generates sparse vector 374 as the output of the processing node 360, instead of sending it to a sequence processor in the processing node 360.

Moreover, while FIG. 3B illustrates processing node 360 receiving bottom-up input 372 from a previous processing node 330, the processing node 360 may be the first processing node in a neural network, and the bottom-up output 372 may be sensed input. Alternatively, when the processing node 360 is an intermediate processing node, the bottom-up output 372 may be the output from a previous processing node 330 or may be the output from multiple processing nodes.

The spatial pooler 350 of the first processing node 330 receives bottom-up input 328 that includes inactive (e.g., assigned a value of zero) and active elements. The active elements can be non-zero values that can either be binary or non-binary values. The bottom-up output 372 generated by the spatial pooler 350 may also include inactive elements, and active elements that are non-zero scalar values. The spatial pooler 350 includes, among other components, an output generator 348 and a plurality of CDs 1 through Z. Compared to the spatial pooler 320 in FIG. 3A, the output generator 348 can generate bottom-up output 372 as a sparse vector in sparse distributed representation, or as a general vector that includes a relatively dense number of active elements. Each element of the bottom-up output 372 may correspond to a CD in the spatial pooler 350.

In one instance, the output generator 348 generates bottom-up output 372 such that elements of the bottom-up output 372 are assigned the match scores of the CDs. Alternatively, the output generator 348 may generate bottom-up output 372 as a sparse distributed representation described in conjunction with FIG. 3A. In such an instance, elements of the bottom-up output 372 corresponding to the selected CDs are assigned the match scores of the selected CDs, while the remaining elements are assigned zeros. For example, when the spatial pooler includes 10 CDs of which the first CD with match score 9 and the fourth CD with match score 8 are selected for high match scores, the bottom-up output 372 may be (9, 0, 0, 8, 0, 0, 0, 0, 0, 0). Thus, the output generator 348 may generate relatively dense outputs, or alternatively sparse outputs in sparse distributed representation.

The processing node 360 receives bottom-up output 372 and generates sparse vector 374. The sparse vector 374 in sparse distributed representation may also includes inactive (e.g., assigned a value of zero) and active elements that are indicated in one of a binary number (e.g., "1" or "0") or non-binary scalar values. The number or percentage of active elements in the sparse vector 374 may be substantially similar to that of sparse vector 342 described in conjunction with the processing node 300 of FIG. 3A. Similar to the spatial pooler 320, the spatial pooler 380 includes, among other components, a sparsity generator 378 and a plurality of CDs 1 through Z.

Each CD in the spatial pooler 380 may be mapped to a subset of elements in the bottom-up output 372. Thus, a CD in spatial pooler 380 may be mapped to a subset of CDs in spatial pooler 350 of the previous processing node 330. In one embodiment, the match score of a CD is generated by applying a set of weights to the subset of elements in the bottom-up output 372 that are mapped to the CD in the spatial pooler 380. For example, the match score of a CD in spatial pooler 380 may be generated by multiplying the weight associated with each element in the bottom-up output 372 that is mapped to the CD, and summing the multiplied results to generate the match score. The set of weights associated with the mappings between a CD and a corresponding subset of elements in the bottom-up output 372 may be determined through a machine-learned process using training input data and corresponding training inference data.

In one instance, mappings between the plurality of co-occurrence detectors for the processing node 360 and the plurality of co-occurrence detectors for the processing node 330 may be relatively sparse, and the percentage of such mappings to the set of possible mappings between the co-occurrence detectors may take up less than a predetermined threshold. For example, the percentage may take up less than 10%, or less than 1%. As another example, mappings between a subset of co-occurrence detectors for the processing node 360 and a subset of co-occurrence detectors for the processing node 330 may be relatively sparse, and the percentage of such mappings to the set of possible mappings within each subset of co-occurrence detectors may take up less than a predetermined threshold, for example, less than 10%, or less than 1%.

The sparsity generator 378 may select a subset of CDs based on the match scores, inhibitory ranges, or intermediate values described in conjunction with the co-occurrence detectors in FIG. 3A. The sparsity generator 378 may further generate the sparse vector 374 as a sparse distributed representation. In one instance, the elements of the sparse vector 374 corresponding to the selected CDs are assigned the match scores of the selected CDs, while the remaining elements are assigned zeros. The structure and functionalities of the sparsity generator 378 may be substantially similar to that of sparsity generator 318.

Overview of Temporal Processing

Temporal processing includes various time-based processing of spatial patterns such as recognizing, predicting or labeling of temporal sequences. Returning to FIG. 3A, sequence processor 314 learns and stores transitions between spatial patterns as represented by sparse vector 342. Based on the learned transitions, sequence processor 314 recognizes and predicts the same or similar transitions in a new input signal. Embodiments provide a temporal processing mechanism that takes advantage of the characteristics of sparse distributed representation vector to learn, recognize and predict temporal sequences of spatial patterns or parts of spatial patterns.

Sequence processor 314 may learn, store and detect temporal sequences of different lengths (also referred to as "variable order" temporal processing). The variable order temporal processing enables learning and detection of more temporal sequences and enhances the predicting, inference or other capabilities of the processing node.

Sequence processor 314 may also learn, store and detect temporal sequences while performing inference, prediction or other temporal processing (also referred to as "online learning"). The online learning collapses a learning (or training) phase and a temporal processing (e.g., predicting) phase into a single phase. By collapsing two distinct phases into a single phase, sequence processor 314 can process information in a more time-efficient manner.

Figure 6:
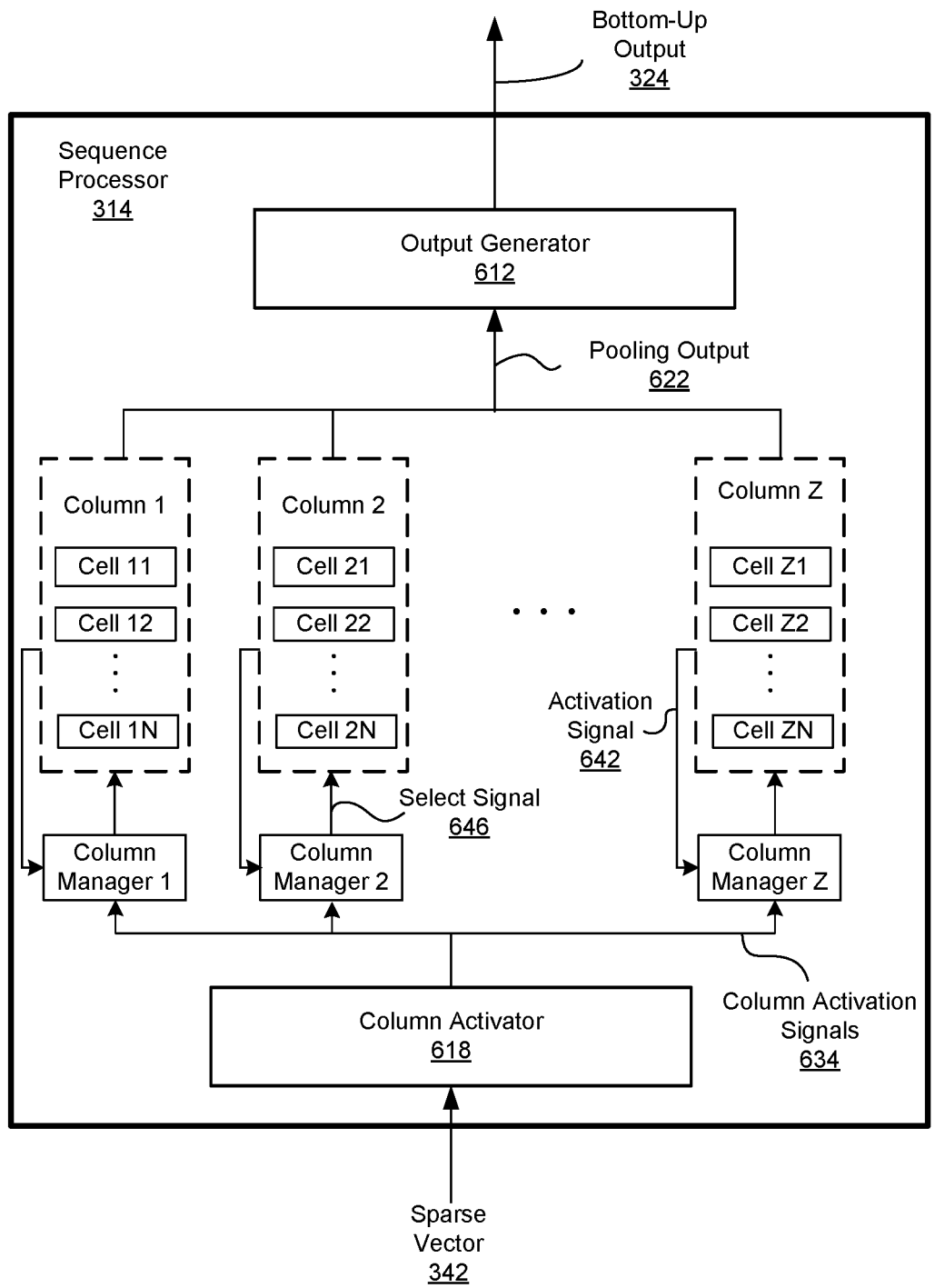
FIG. 6 is a block diagram illustrating a sequence processor in a processing node, according to one embodiment.

FIG. 6 is a block diagram illustrating sequence processor 314, according to one embodiment. Sequence processor 314 may include, among other components, output generator 612, columns of cells (in dashed boxes), column managers and column activator 618. Column activator 618 receives sparse vector 342 from spatial pooler 320. In response, column activator 618 generates column activation signals 634 indicating which columns to be activated based on sparse vector 342.

Each column is connected to an associated column manager. The column manager receives the column activation signal 634, determines activation states of cells in the column (based on activation signal 642), and sends select signal 646 to activate one or more cells in the column under certain circumstances. In one embodiment, the column manager sends select signal 646 to one or more cells in the column if no cell in the column is currently active. In another embodiment, the column manager sends select signal 646 to one or more cells in the column despite the presence of other cells already active in the column. The selected cells then learn a temporal sequence by making connections to active cells in other columns, as described below in detail with reference to FIG. 12A. The column manager may select the cell to learn the connections randomly or according to a predetermined list.

The number of total columns may coincide with the total number of elements in sparse vector 342. The column activator 618 receives sparse vector 342 and determines which elements of sparse vector 342 are active. Then, column activator 618 sends column activation signals 634 to corresponding columns to activate these columns.

In one embodiment, each column includes the same number (N) of cells. The cells in the column are activated by select signal 646 or sequence outputs from other cells in the same processing node 300 or level, as described below in detail with reference FIG. 11. When a cell in a column becomes activated, the active cell inhibits activation of other cells in the same column except in certain limited circumstances.

In one embodiment, each column includes a single cell. Sequence processor 314 with single-cell columns may be capable of learning first order temporal transitions. The learning of first order temporal transitions can be useful in learning "spatial" invariances such as translation and scale. For example, sequence processor 314 with single-cell columns is used in identifying objects or items in a non-moving single image (referred to as 'flash inference'). As the bottom-up input 328 or sensed input include higher orders of temporal variances or complex transitions, sequence processor 314 with multi-cell columns tends to show better performance compared to sequence processor 314 with single-cell columns. Nodes at different hierarchical levels of the HTM system may employ sequence processors 314 with a different number of cells. In one embodiment, sequence processor 314 in the lowest level nodes (e.g., node 110 of HTM system 100 in FIG. 1) include single-cell columns while sequence processors 314 in higher level nodes (e.g., nodes 120 and 130) include multi-cell columns.

The cells individually, or collectively as a column, send pooling output 622 to output generator 612. In most applications, a pooling output is generated from each cell to indicate whether the cell is active. In certain applications (e.g., flash inference), a column generates a pooling output to indicate whether any of the cells in the column are activated. In such application, once any cell in the column is activated, the column sends a pooling output indicating that the column is active. Although the pooling output takes a binary value in most cases, the pooling output may also be a non-binary value. For example, the pooling output may have an integer or real-number value indicating the strength of cell activation.

In one embodiment, output generator 612 collects the pooling outputs 622 from the cells or columns and concatenates these outputs into a vector. The concatenated vector may be sent as bottom-up output 324 of sequence processor 314 to a parent processing node for further temporal processing and/or spatial pooling. Alternatively, the concatenated vector may be provided as an output of the temporal memory system or be further processed to identify a higher level cause of the input signal. The output generator 612 may also function as a buffer and synchronize signals from sibling processing nodes.

The bottom-up output 324 is also a vector in a sparse distributed representation. The percentage of active (or inactive) elements in the bottom-up output 324 may be approximately 10% to 50%. However, the percentage of active (or inactive) elements in the bottom-up output 324 is not restrictive, and may be less than 10% or more than 50%.

Example Operation and Function of Cell

Sequence processor 314 performs temporal processing by selectively activating cells (and columns), and learning previous states of cell activations. As the learning at the cells progresses, the cells learn to anticipate spatial patterns in bottom-up input 328 and activate before corresponding spatial patterns appear in bottom-up input 328. After learning, the cells remain active for a longer time, producing more stable and invariant bottom-up output 314 to a parent node.

Figure 7:
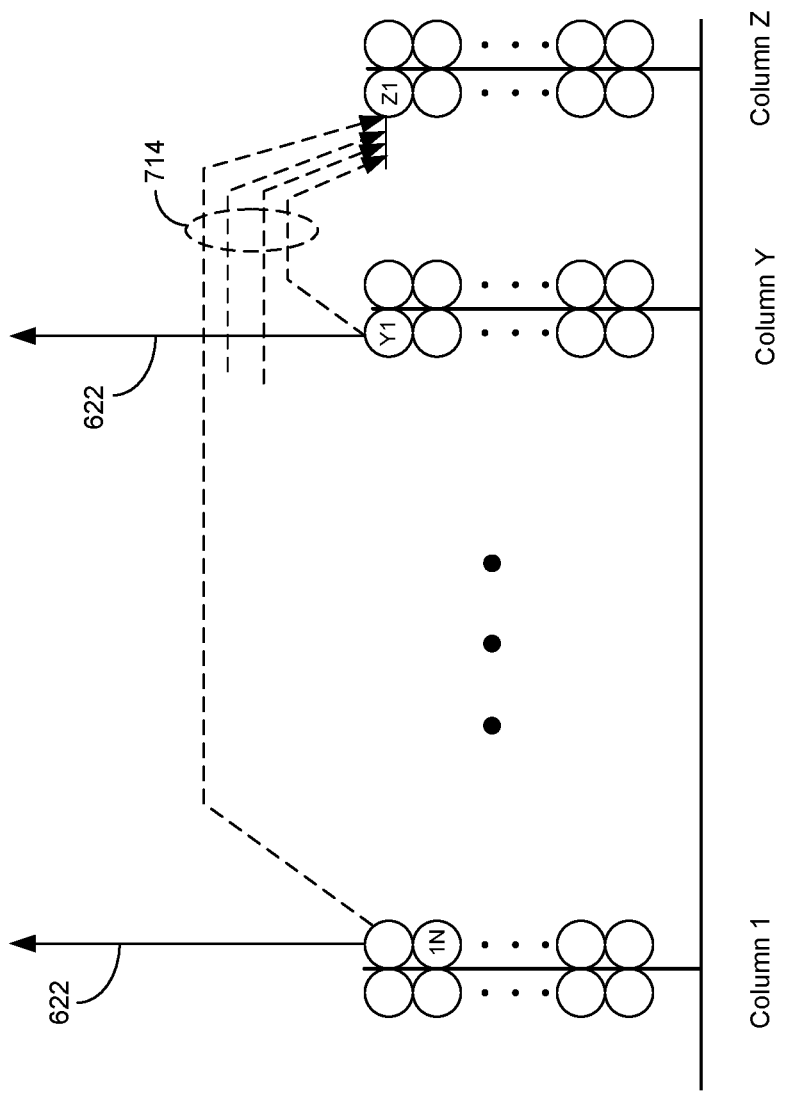
FIG. 7 is a diagram illustrating the structure of columns and output signals from cells, according to one embodiment.

FIG. 7 is a diagram illustrating columns and output signals from the cells, according to one embodiment. Each circle in FIG. 7 represent a cell. When each cell becomes active, the cell sends out pooling output 622. An activated cell may also send out sequence output 714 to other cells to indicate its activation state. A basic idea behind implementing temporal processing is to have a learning cell, upon activation, detect activation states of other cells and store the activation states in a "temporal memory segment." The stored activation states may be current activation states and/or previous activation states of other cells. A "temporal memory segment" herein refers to a data structure for storing the activation states of other cells.

In storing the activation states, the cell selects a subset of active cells and stores only the states of the selected cells. A large number of cells in a processing node may be active at the same time. Therefore, large memory space may be needed to store activation states of all activated cells in the processing node. To reduce the memory requirement, a small number of active cells may be sub-sampled and states of the sub-sampled cells may be stored in the temporal memory segments of the cell. For example, when cell Z1 is first activated, cell Z1 could receive activation states of all active cells (e.g., 50 cells) at this time step but stores information for only a select number of cells (e.g., 10 cells). The sub-sampling of cells may also contribute to generalization of spatial patterns and/or temporal sequences.

In one embodiment, each temporal memory segment stores the activation states of the same number of cells. In another embodiment, each temporal memory segment stores the activation states of a different number of cells.

When a cell detects activation of all or over a percentage of cells stored in its temporal memory segments, the cell becomes active and produces pooling output 622. For example, a cell may be activated when more than 90% of cells identified in a temporal memory segment are active. In one embodiment, the cells become active based on a sliding activation window, as described below in detail with reference to FIGS. 8A and 8B. Under certain conditions, the cell may also produce sequence output 714 sent to other cells to indicate its activation state. In one embodiment, a cell becomes active when a fixed number of cells or more than a threshold percentage of cells stored in one of its temporal memory segments become active. In other embodiments, the cells become active when the activation states of other cells partially or entirely match a list of stored activation states, as described below in detail with reference to FIGS. 8C and 8D.

Figure 8A:
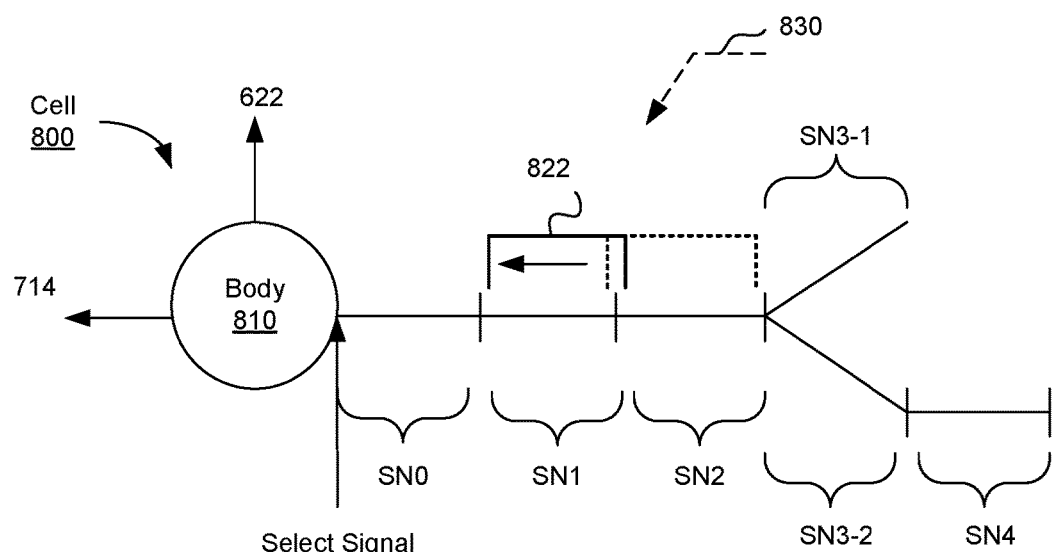
FIG. 8A is a conceptual diagram illustrating the operation of a cell, according to one embodiment.

FIG. 8A is a conceptual diagram illustrating signals associated with a cell 800, according to one embodiment. Cell 800 receives sequence inputs 830 and select signal 646. Sequence inputs 830 are collective sequence outputs sent out by other cells having connections with cell 800. Cell 800 establishes connections with the other cells during learning to monitor their activation states. Cell 800 also receives select signal 646 which becomes active when: (i) the column including cell 800 is activated by column activation signal 634, and (ii) cell 800 is selected to learn activation states of other cells, as described below in detail with reference to FIG. 13.

In one embodiment, a cell receives sequence input 830 from other cells within a topological distance. The topological distance is associated with or representative of the distance between the input space of the cell receiving sequence input 830 and the input space of the other cell. In another embodiment, a cell receives sequence input 830 from all or a subset of the cells within the processing node.

Cell 800 generates pooling output 622 and sequence output 714 based on select signal 646 and sequence inputs 830. Pooling output 622 is generated whenever cell 800 becomes active. Sequence output 714 is generated only when certain conditions are met, as described below in detail with reference to FIG. 11.

Cell 800 includes temporal memory segments SN0 through SN4 representing data structures for storing activation states of other cells upon activation of cell 800. Temporal memory segments with higher segment numbers are illustrated in FIG. 8 as being farther away from body 810 of cell 800. First temporal memory segment SN0 stores the activation state of other cells when cell 800 was first activated by select signal 646. Second temporal memory segment SN1 (adjacent to first temporal memory segment SN0) stores current or previous activation states of other cells when cell 800 was activated by first temporal memory segment SN0.

A temporal memory segment with a higher segment number represents activation states of other cells further back in time. For example, if segment SN0 stores activation states of other cells at time T=N, segment SN1 may store activation states of other cells at time T=N−1, and segment SN2 may store activation states of other cells at time T=N−2. When sequence inputs 830 indicate activation of cells stored in any of these temporal memory segments, cell 800 is activated. Hence, a temporal memory segment with a higher number (father away from body 810) generally causes cell 800 to detect an earlier state of a temporal sequence whereas a temporal memory segment with a lower number (closer to body 810) generally causes cell 800 to detect a later state of a temporal sequence.

Multiple temporal memory segments may be connected to a single temporal memory segment to represent multiple sets of activation states preceding a particular set of activation states. Taking the example of FIG. 8, temporal memory segments SN3-1 and SN3-2 bifurcate from temporal memory segment SN2. The bifurcation represents that two different sets of activation states of other cells stored in temporal memory segments SN3-1 and SN3-2 preceded the activation states of other cells stored in temporal memory segment SN2. A cell can include many branches of temporal memory segments separating from various temporal memory segments. Generally, the overall shape of the temporal memory segments is similar to a tree. Such tree shape signifies that different states of cell activations gradually merge and come to share the same cell activation states as the time for receiving select signal 646 approaches.

In one embodiment, temporal memory segments of cell 800 store identifications of a subset of cells active when cell 800 was first activated. For example, temporal memory segment SN1 stores a vector representing five cells such as [5, 10, 27, 38, 40] (where each number indicates identification of a cell in processing node 300). The five cells may be a subset of fifty cells that were active when cell 800 was activated. The cells for storing information about the vector may be selected randomly or based on certain criteria.

As multiple vectors are detected, a list of vectors may be generated for the selected cell. After learning, the cell is activated when sequence input includes a vector completely matches to one of the list of vectors that the cell is storing or the number/percentage of elements matching the list of vectors exceed a threshold. As in the above example, cell 800 is activated when cell 800 receives sequence inputs 830 indicating activation of cells 5, 10, 27, 38 and 40 or sequence inputs 830 indicate that more than a certain number/percentage of these elements are active.

In another embodiment, cell 800 is activated when sequence inputs 830 indicate that all or part of cells identified in sliding activation window 822 are active. Cell 800 slides activation window 822 along the chain or branch of temporal memory segments. Activation window 822 spans across two or more adjacent temporal memory segments. When cell 800 detects at any locations along the temporal memory that a minimum number of elements in activation window 822 are currently active, cell 800 is activated. In one embodiment, activation window 822 has a length corresponding to the length of a temporal memory segment. That is, if the size of a temporal memory segment is N bits, an activation window covers "x" contiguous bits from one temporal memory segment and "N–x" contiguous bits from an adjacent temporal memory segment (where "x" takes a value ranging from 1 to N–1).

Figure 8B:
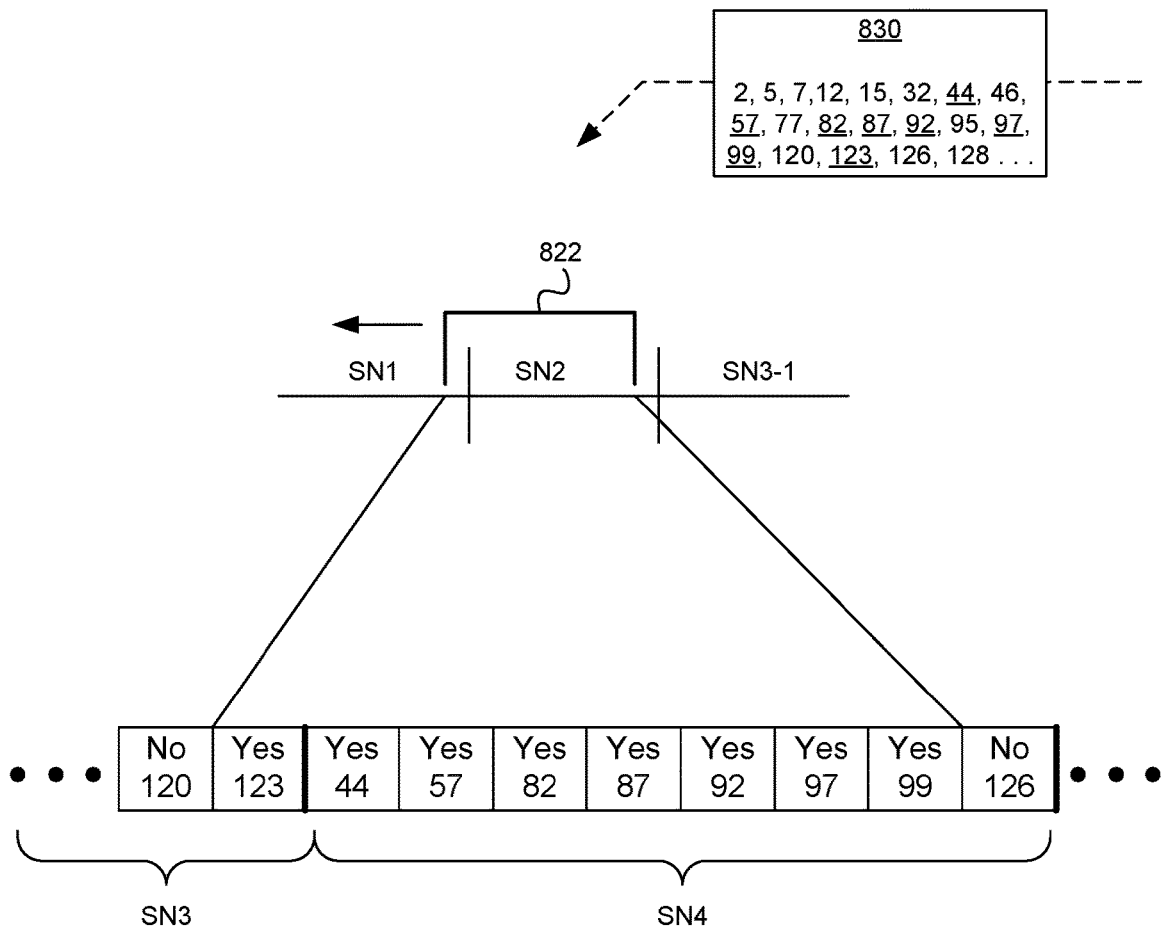
FIG. 8B is a diagram illustrating operation of an activation window, according to one embodiment.

FIG. 8B is a diagram illustrating activation window 822 covering a single element from temporal memory segment SN1 and seven elements from temporal memory segment SN2 of FIG. 8A. In this example, it is assumed that all of the elements in sliding window 822 must be active to activate the cell. In other examples, only a number of elements may be active to activate the cell. In this example, sequence inputs 830 indicate cells 2, 5, 7, 12, 15, 32, 44, 46, 57, 77, 82, 87, 92, 95, 97, 99, 120, 123 and 128 as being active. "Yes" represents that sequence inputs 830 indicate that the cell associated with the element is currently active whereas "No" represents that sequence inputs 830 indicate that the cell associated with the element is currently inactive. Numbers in boxes below these letters indicate identification of cells (e.g., cell numbers) associated with the elements. Note that eight boxes in temporal memory segment SN4 represent cells 44, 57, 82, 87, 92, 97, 99 and 126 that were active when cell 800 was activated by temporal memory segment SN1. In the example of FIG. 8A, the cell is activated because all elements covered by window 822 are currently active.

For comparison, take an example where activation window 822 covers all eight elements from temporal memory segment SN4. In such a case, cell 800 is not activated because cell 126 is not currently active. Hence, by using an activation window, cells become active even when sequence input 830 does not indicate activation of elements in a single temporal memory segment.

Figure 8C:
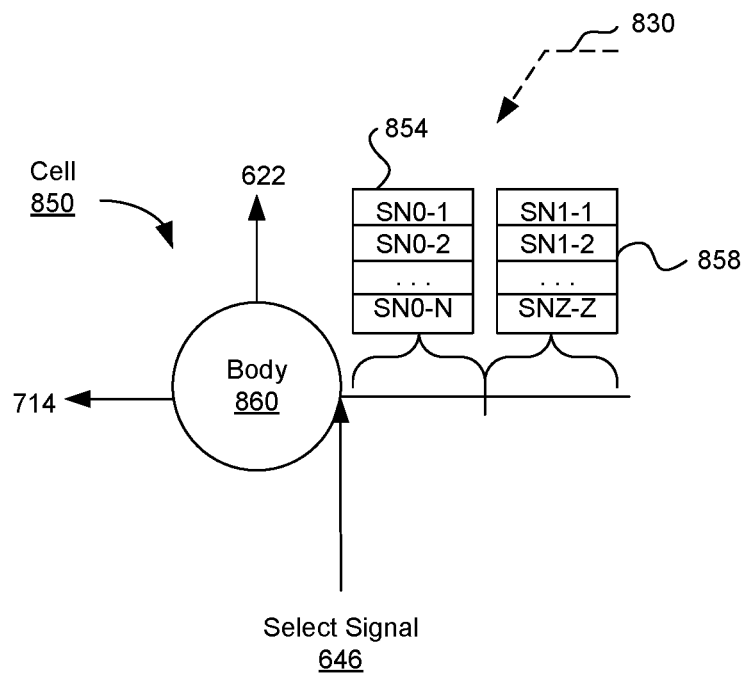
FIG. 8C is a conceptual diagram illustrating a cell storing two tables for temporal memory segments, according to one embodiment.

FIG. 8C is a conceptual diagram of a cell 850 storing data for temporal memory segments in two tables, according to one embodiment. Cell 850 is a simplified version of cell 800 in that all temporal memory segments are classified as (i) first temporal memory segments (SN0-1 through SN0-N) or (ii) non-first temporal memory segments (SN1-1 through SNZ-Z). Taking the example of temporal memory segments in FIG. 8A, SN0 would correspond to a first temporal memory segment while SN1, SN2, SN3-1, SN3-2 and SN4 would correspond to non-first temporal memory segments in cell 850.

When the activation window is not used, there is no reason to retain information regarding which temporal memory segments are adjacent to each other. Hence, all activation states of non-first temporal memory segments are collapsed and stored in table 858. All activation states of first temporal memory segments are stored in table 854. When sequence inputs 830 are received, the activation states of other cells are compared with sets of activation states stored in tables 854 and 858.

When the activation states as indicated by the sequence inputs 830 match entirely or partially with the activation states in an entry of the table 858, body 860 of cell 850 generates pooling output 622 but not sequence output 830. In contrast, when the activation states as indicated by the sequence inputs 830 match entirely or partially with the activation states in an entry of the table 854, body 860 of cell 850 generates both pooling output 622 and sequence output 830.

Figure 8D:
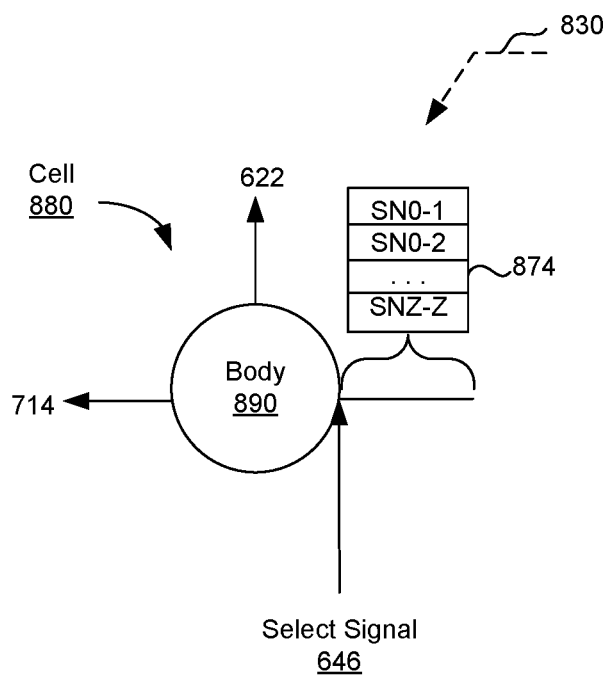
FIG. 8D is a conceptual diagram illustrating a cell storing a single table for storing all temporal memory segments, according to one embodiment.

FIG. 8D is a conceptual diagram of a cell 880 further simplifying cell 850, according to one embodiment. Cell 880 of FIG. 8C is similar to cell 850 of FIG. 8C except that sets of activation states in all temporal memory segments are stored in a single table 874. When the sequence inputs 830 indicate activation states of other cells that match totally or partially with one set of activation states as stored in an entry of table 874, body 890 outputs both pooling output 622 and sequence output 714 as appropriate. In embodiments with no hierarchy, all the temporal memory segments may be first temporal memory segments.

Cells 850 and 880 are simpler and more efficient compared to cell 800 because whether to activate the cells can be determined by comparing sequence inputs 830 and entries in tables without using an algorithm to determine matching of activation states in an activation window.

Figure 9:
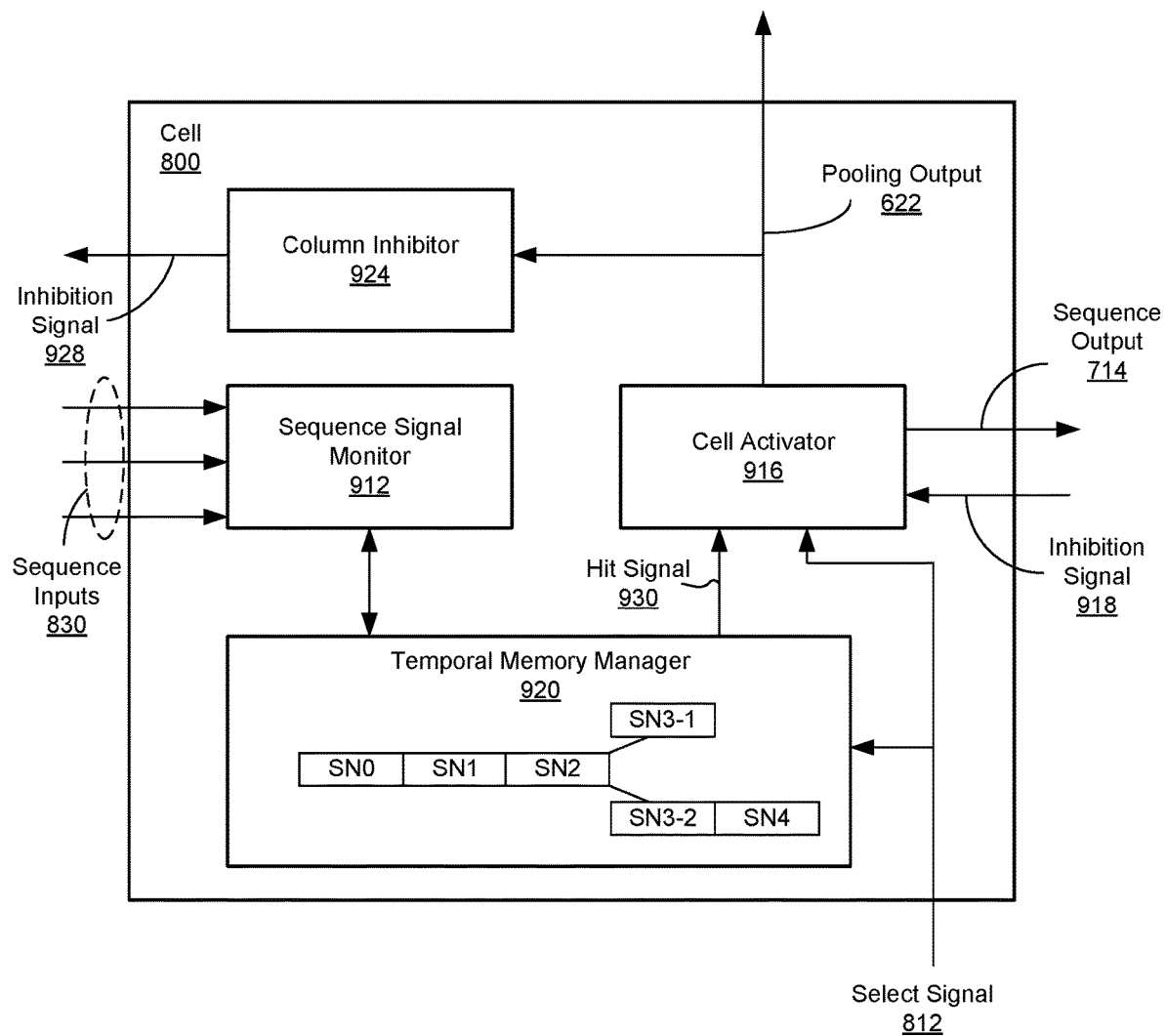
FIG. 9 is a block diagram illustrating a cell, according to one embodiment.

FIG. 9 is a functional block diagram illustrating cell 800, according to one embodiment. Cell 800 may include, among other components, sequence signal monitor 912, cell activator 916, temporal memory manager (TMM) 920 and column inhibitor 924. The sequence signal monitor 912 is software, firmware, hardware or a combination thereof for receiving sequence inputs 830 from other cells in the same processing node or level. The sequence signal monitor 912 buffers sequence inputs 912 at a current time step. In one embodiment, the sequence signal monitor 912 may also buffer a set of sequence inputs 830 from previous time steps. The stored sequence inputs 912 are referenced by DMM 920 for processing.

DMM 920 is software, firmware, hardware or a combination thereof for managing temporal memory segments. DMM 920 performs various operations associated with writing, updating, retrieving and comparing cell activation states. As described above in detail with reference to FIGS. 8A and 8C, cell activation states stored in different temporal memory segments of DMM 920 represent activation states of other cells at different times. When learning is activated, DMM 920 detects current and/or previous states of cell activations based on the sequence inputs 830 and stores the detected cell activation states in temporal memory segments. DMM 920 also compares the sequence inputs 830 to cell activation states stored in temporal memory segments. If the sequence inputs 830 indicate that (i) all elements of a temporal memory segment are active, (ii) a number or percentage of elements of a temporal memory segment above a threshold is active, (iii) all elements in an activation window are active, or (iv) a number or percentage of elements of an activation window above a threshold is active, DMM 920 sends hit signal 930 to cell activator 916.

DMM 920 may also employ various schemes to enhance learning, inference or prediction capability such as removing cell activation states that appear with frequency below a threshold, merging similar cell activation states and requiring two or more repetition of the same cell activation states before the cell activation states are stored (or learned).

Cell activator 916 receives hit signal 930 from DMM 920 and generates pooling output 622 and sequence output 714, if certain conditions are met. One of such conditions is that there be no inhibition signals 918 from other cells in the same column or in a different column. If inhibition signal 918 is received from other cells, cell 800 is not activated despite hit signal 930. In one embodiment, pooling output 622 is generated regardless of the reasons cell 800 is activated whereas sequence output 714 is generated only when first temporal memory segment SN0 causes cell 800 to activate.

After cell activates and starts to generate pooling output 622, column inhibitor 924 generates inhibition signal 928. Inhibition signals are sent to other cells in the same column or in a different column to inhibit activation of the other cells. The cells communicating the inhibition signals may be within a predefined inhibition range, as described above in detail with reference to FIG. 3A.

In one embodiment, DMM 920 uses a dynamic threshold for generating hit signal 930. Specifically, DMM 920 dynamically adjusts the number or percentage of elements of sequence inputs 830 that should match the elements stored in a temporal memory segment or an activation window before hit signal 930 can be generated.

Activation of cell 800, among other things, represents a prediction based on activation of other cells in sequence processor 314. By lowering the number of percentage of coinciding elements to generate hit signal 930, cell may be activated more frequently. More frequent activation of cell indicates making more liberal predictions on the part of cell. Lowering the requirement for coinciding elements has a similar effect of forcing the cells or the temporal memory system to make predictions that would otherwise not be made. To the contrary, raising the requirement for coinciding elements has a similar effect of restricting the cells or the temporal memory system to making only conservative and limited predictions.

The threshold for generating the hit signal 930 may be adjusted by detecting activation states of cells corresponding to a certain segment of input space. If the level of cell activation for such segment drops below a level, the dynamic threshold of cells for the segment of input space is lowered to prompt more activation of the cells. Conversely, if the level of cell activation of a segment of input space it above a level, the dynamic threshold may be increased to reduce activation of the cells.

Method of Performing Temporal Processing

Figure 10:
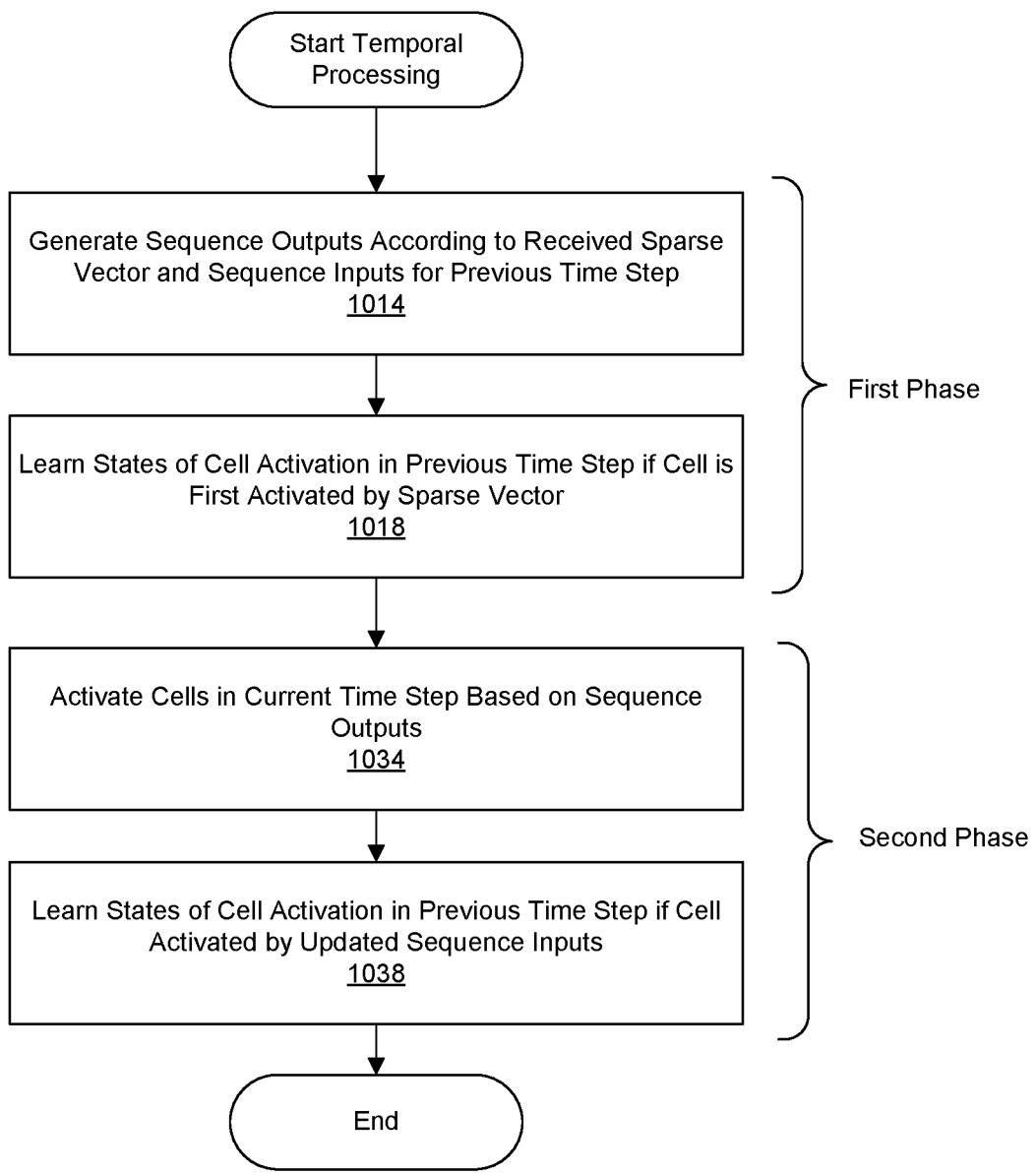
FIG. 10 is a flowchart illustrating the process of performing temporal processing, according to one embodiment.

FIG. 10 is a flowchart illustrating the process at sequence processor 314, according to one embodiment. Although sequence processor 314 does not require the concept of 'time step' to learn and process temporal sequences, the example described with reference to FIG. 10 employs time steps to simplify the implementation of sequence processor 314 on a computing device. For the sake of convenience, the steps of FIG. 10 are conceptually divided into two phases: a first phase and a second phase.

In the first phase, sequence processor 314 generates 1014 sequence outputs 830 based on column activation signals 634. In this step, sequence outputs 830 are generated from cells in activated columns, as described below in detail with reference to FIG. 11.

If a cell is first activated by a column activation signal and there are other active cells in a previous time step, the newly activated cell learns 1018 connections to a select number of the active cells and stores the activation states of these selected cells in first temporal memory segment SN0 (see FIG. 8A), table 854 (see FIG. 8C) or table 874 (see FIG. 8D), as described below in detail with reference to FIG. 12A. In one embodiment, the states of cell activation in the previous time step are stored and available from sequence signal monitor 912.

In the second phase, sequence processor 314 activates 1034 cells in a current time step based on the sequence outputs generated in step 1014. The activated cells generate pooling outputs 622 for the current time step.

Cells newly activated by the sequence outputs learn and store 1038 activation states of other cells, as described below in detail with reference to FIG. 13.

The method of performing temporal processing as illustrated in FIG. 10 is merely illustrative. Various modifications can be made such as performing steps in a different order, performing steps in parallel or omitting one or more steps.

Figure 11:
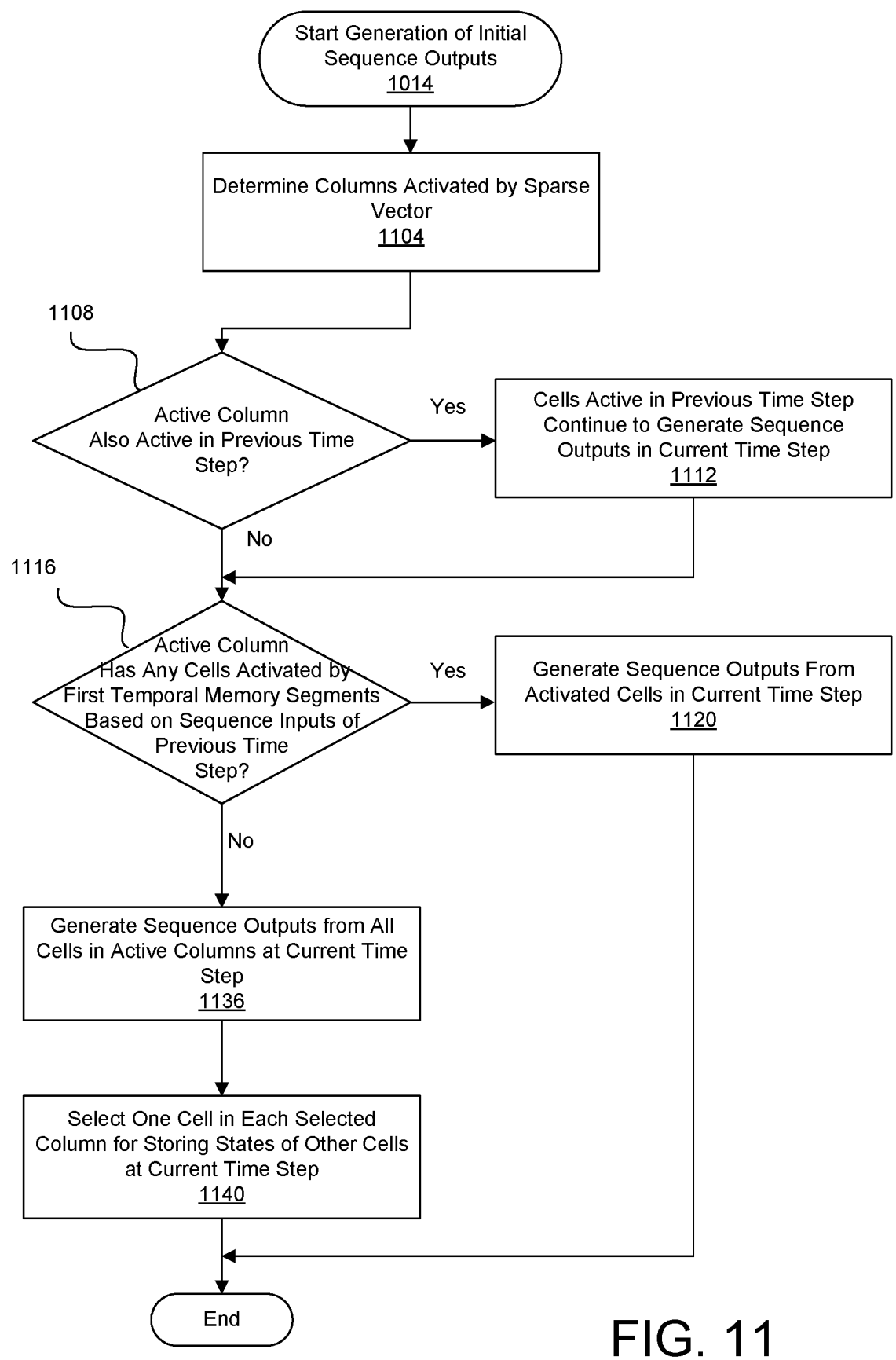
FIG. 11 is a flowchart illustrating the process of generating sequence outputs in more detail, according to one embodiment.

FIG. 11 is a flowchart illustrating the process of generating sequence outputs in more detail, according to one embodiment. Sequence processor 314 determines 1104 columns to activate based on sparse vector 342 in a current time step. Then, sequence processor 314 determines 1108 whether a column activated in the current time step was also active in a previous time step. If a column was also active in the previous time step, then no change is made to the activation states of cells in that column. That is, any cells in the column active in the previous time step continue 1112 to output sequence outputs in the current time step. Then the process proceeds to process other columns that were not active in the previous time step.

Sequence processor 314 determines 1116 if a column has cells activated by sequence inputs 830 in the previous time step. In one embodiment, sequence processor 314 determines if the cells were activated by their first temporal memory segments. In one embodiment, any cells activated by temporal memory segments other than their first temporal memory segments do not generate sequence outputs. The cells activated by the first temporal memory segments generate 1120 sequence outputs in the current time step. In another embodiment where all segments are first temporal memory segments, sequence outputs are generated for cells activated by a first temporal memory segment.

If there were no cells in the column that were activated by sequence inputs 830 in the previous time step, all cells in the column generate 1136 sequence outputs. By activating all cells in the column, all or most of the potential temporal sequences in the input data can be detected in subsequent time steps.

A cell is then selected 1140 from the active column to learn and store activation states of other cells at current time step cells, as described below in detail with reference to FIG. 13. In one embodiment, the cell is selected randomly. In another embodiment, the cell with a temporal memory segment storing activation states most similar to the current activation states is selected. The selected cell generates 1132 a sequence output in the current time step. Then the process terminates.

If there are no cells active in the previous time step, all cells in the activated column are turned on to generate 1136 sequence outputs in the current time step. Then the process terminates.

The process of producing the sequence outputs as illustrated in FIG. 11 is merely illustrative. Various other methods and schemes may be employed to generate sequence outputs at cells.

Figure 12A:
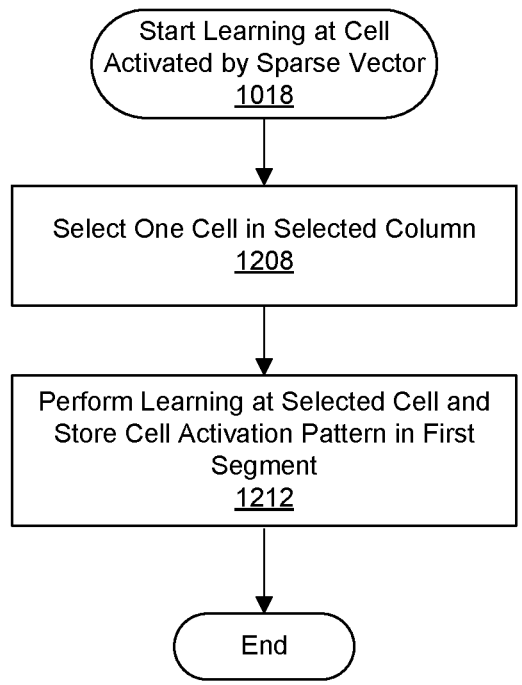
FIG. 12A is a flowchart illustrating the process of learning connections between cell activation states upon activation by a column activation signal, according to one embodiment.

FIG. 12A is a flowchart illustrating a process of learning connections between cell activation states upon activation of a column by a column activation signal, according to one embodiment. If no cell in the column is active when the column activation signal is received at the column manager, one cell is selected 1208 from the column for activation. The selected cell then performs learning 1212 by storing information about a subset of cells active at the previous time step in first temporal memory segment (as described above in detail with reference to FIG. 8A) or in a table (as described above with reference to FIGS. 8C and 8D). In another embodiment, the cell selected to perform learning is the one in the column with the closet partial mapping to the subset of cells active at the previous time step.

Figure 12B:
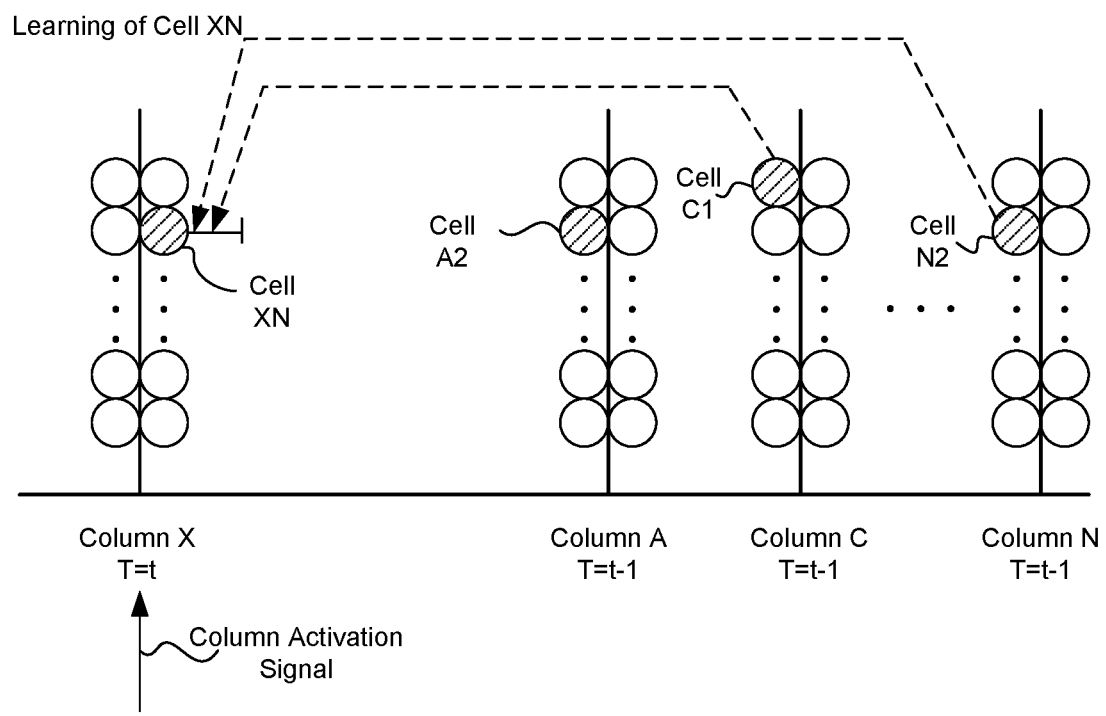
FIG. 12B is a conceptual diagram illustrating learning of cell activation states at a cell upon activation by a column activation signal, according to one embodiment.

FIG. 12B is a conceptual diagram illustrating learning of cell activation states at cell XN upon activation by a column activation signal, according to one embodiment. When a column activation signal for column X is received at time t and no cell in column X is currently active, the column manager for column X selects cell XN for activation. The selection of cell XN may be made randomly or on predetermined criteria.

Cell XN then determines which cells were active in the previous time step (T=t−1) based on sequence inputs in the previous time step. In another embodiment, cell CN can sub-sample cells that are active in current time step (T=t). Cell XN sub-samples the activated cells (e.g., samples cell C1 and cell N2 but not cell A2) and stores the activation states of the sub-sampled cells in the first temporal memory segment, indicated by a horizontal bar extending from cell XN.

Figure 13:
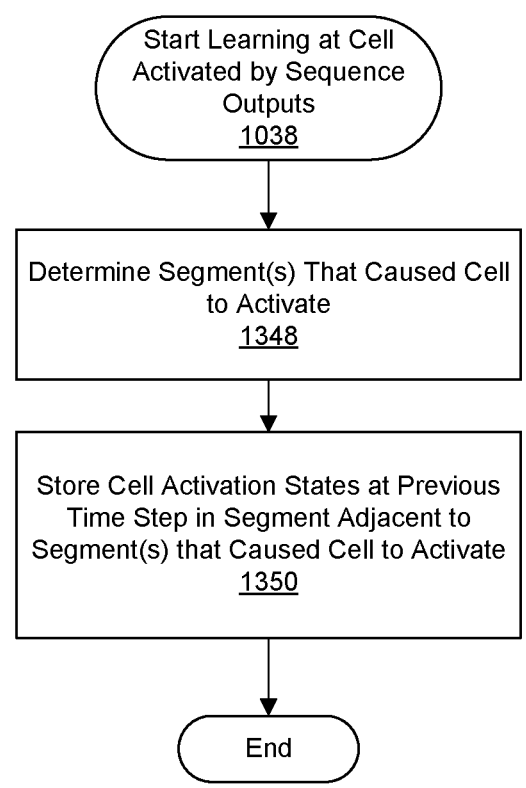
FIG. 13 is a flowchart illustrating the process of learning connections between cell activation states at a cell, according to one embodiment.

FIG. 13 is a flowchart illustrating the process of learning at a cell activated by sequence inputs, according to one embodiment. First, the activated cell determines 1348 the temporal memory segment(s) that caused the cell to activate. The temporal memory segment(s) causing the cell to activate is a temporal memory segment having elements all or part of which were indicated as being activated by sequence inputs.

Then the activated cell stores 1350 the activation states of a subset of active cells that were active in the previous time step. The subset of active cells is stored in a temporal memory segment adjacent to the temporal memory segment(s) that caused the cell to activate.

The methods of learning at a column or a cell as described above with reference to FIGS. 12A and 13 are merely illustrative. Various other methods may be used to learn and store connections to previous cell activation states.

As learning progresses, cells gradually learn activation states going further back in time. Although a cell learns activation states of other cells at the time the cell was activated or just before the cell was activated, the other cells in most cases would have activated before the learning cell was activated. More specifically, when a processing node is presented with a temporal sequence at a first time, a learning cell detects and stores the current or previous activation states of other cells when the learning cell became active.

All or most of other cells would have become active before the learning cell was activated. Hence, when the same processing node is again presented with the same temporal sequence, the learned cell activates at an earlier time in the temporal sequence because the other cells become active before a time point in the temporal sequence when the learning cell detected and stored the activation states of other cells. As the processing node is presented with the same temporal sequence multiple times, the learned cells gradually produce pooling outputs for a longer time starting at an earlier time point in the same temporal sequence.

Figure 14A:
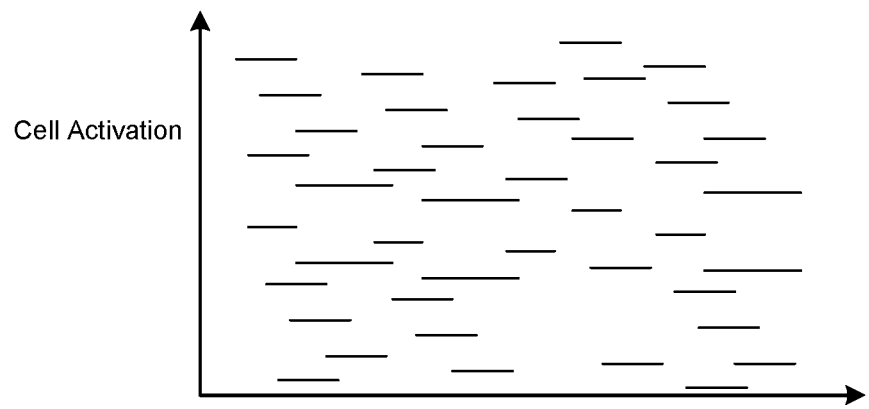
FIG. 14A is a graph illustrating cell activation states of cells in a node before temporal processing, according to one embodiment.
Figure 14B:
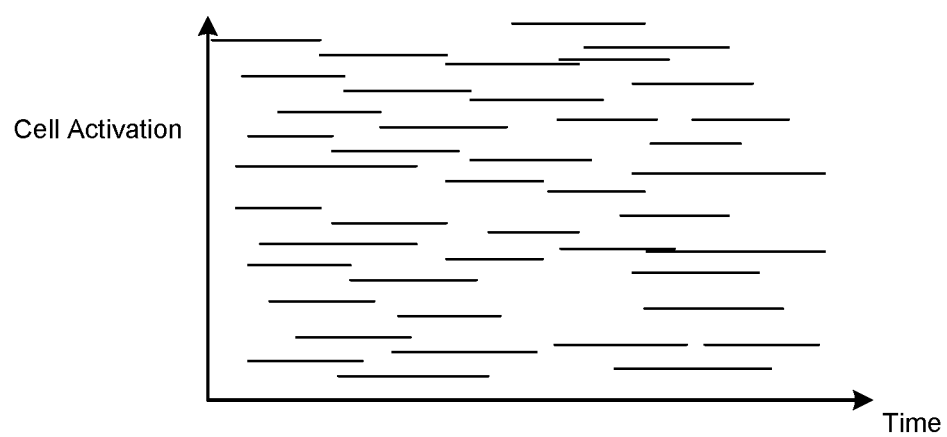
FIG. 14B is a graph illustrating cell activation states of the cells in the node after temporal processing, according to one embodiment.

FIG. 14A is a graph illustrating cell activations before learning and temporal processing are performed. With learning and temporal processing, the cells learn cell activation states of other cells further back in time step. Hence, as the learning at the cell progresses, the cells gradually activate earlier and remain active for a longer time, as illustrated in FIG. 14B. The extended activation of cells results in pooling outputs invariant and stable for a longer time.

Early activation of the cells also represents that the cells are performing prediction of spatial patterns to appear in the input data. As the cells learn activation states of other cells further back in time, the cells predict appearance of the spatial patterns corresponding to stored co-occurrences earlier in time and become activate in advance.

Overloading Cell with Different Temporal Sequences

If all cells in a column become populated with cell activation states, no temporal memory segment or cells may be available to store additional temporal sequences. Taking the example of first temporal memory segments of cells, the first temporal memory segments store activation states of a subset of other cells upon activation of the cells by select signal 646. After first temporal memory segments in entire cells of a column are assigned to store cell activation states, there is no cell left in the column to store additional cell activation states upon activation of the column. In such case, additional capacity to learn temporal sequences can be afforded, for example, by one of the following ways: (i) add or adjust cells in a column, (ii) add additional temporal memory segments to a cell or (iii) overload temporal sequences in preexisting temporal memory segments.

First, adding new cells to a column is a simple solution for increasing the capacity to store temporal sequences. There is no requirement that each column include the same number of cells. Hence, the number of cells may be increased in columns that are activated more frequently. Alternatively, a cell previously assigned to one column may be reassigned to another column if the other column becomes overloaded. Creation or addition of new cells, however, increases memory and processing resources required for operating the processing node.

Another way of extending the capacity of the sequence processor is to add more temporal memory segments to a cell. A cell may start a new chain of temporal memory segments (in addition to a preexisting chain of temporal memory segments) or add entries in tables for storing activation states when there is no applicable temporal memory segment to store new cell activation states. The new chain of temporal memory segments may start from the body of the cell or at any locations along a branch of temporal memory segments. In one embodiment, when a cell is selected a second time by a column manager, a new chain of temporal memory segments is started in order to store the cell activation states in the first temporal memory segment of the new temporal memory. The cell is then activated when the current cell activation states correspond to stored cell activation states in temporal memory segments of either temporal memory chain. The activation of the cell based on temporal memory segments of either temporal memory chain may cause ambiguity at a cell level as to which temporal sequences are active. However, the ambiguity at the cell level is unlikely to cause issues in at the system level of temporal memory system because the activation states of not one cell but a set of multiple cells is used to represent the temporal sequences.

FIG. 8A illustrates an example where a new branch of temporal memory segments starts after temporal memory segment SN2. Cell 800 stores sequence inputs in temporal memory segment SN3-1 after cell 800 is activated at a first time by temporal memory segment SN2. If cell 800 is activated at a second time and detects cell activation states other than what is stored in temporal memory segment SN3-1, cell 800 may store the newly detected cell activation states in temporal memory segment SN3-2 and start a new branch of temporal memory segments.

A cell is activated when the sequence inputs indicate activation of elements stored in any temporal memory segments or an activation window. Since a cell can be activated by two different temporal sequences, ambiguity may arise as to which temporal sequences caused the cell to activate. Such ambiguity, however, does not cause systemic failure of the temporal memory system because the probability of two different temporal sequences causing the same or similar set of active cells to activate at the same time is very low, especially if a large number of cells are used.

Compared to adding new cells, adding new temporal memories is more efficient in terms of memory and processing requirements. When detecting cell activations states, the activation window must slide along different branches or chains of temporal memories, and hence, the processing speed may be decreased slightly.

A third way of extending the capacity of the sequence processor is to overlay different sets of cell activation states in preexisting temporal memory segments. That is, instead of starting a new branch or chain of temporal memory segments for different temporal sequences, the same temporal memory segment stores two or more cell activation states associated with different temporal sequences. The cell is activated when the sequence inputs received indicate activation of a minimum number of elements in a temporal memory segment or an activation window.

An example for using an activation window is provided herein. Assume, for example, that Nth temporal memory segment in a particular cell stores vectors A and B, and (N+1)th temporal memory segment stores vector C and D (each vector represents a set of learned cell activation states). Vector A is (2, 5, 11, 16, 22), vector B is (12, 17, 22, 45, 68), vector C is (6, 9, 14, 22, 88) and vector D is (7, 8, 25, 43, 22) (where each element in vectors represents a detected active cell upon activation of the particular cell). Taking an example where the activation window covers three elements from Nth temporal memory segment and two elements from (N+1)th temporal memory segment, the particular cell will be activated by the activation window if the sequence inputs indicate activation of entire or most of elements in any of the following vectors: (6, 9, 11, 16, 22), (7, 8, 11, 16, 22), (6, 9, 22, 45, 68) and (7, 8, 22, 45, 68).

Overlaying multiple vectors onto the same temporal memory segment increases ambiguity and likelihood of improper activation at the cell level because the cell can be activated by combinations of unrelated cell activation states. In a case where vector A is followed only by vector C and vector B is followed only by vector D, the overlaying of the vectors A and B into one temporal memory segment and vectors C and D into the adjacent temporal memory segment removes information about such sequential relationships between the vectors. Hence, the cell can be improperly activated by sequence inputs such as (7, 8, 11, 16, 22) derived from the combination of vectors A and D. However, given the large number of cells and possible combinations, such improper activation of cells do not cause a systemic error until a large number of vectors are overlaid onto the same temporal memory segment. In an experiment, as many as twenty different vectors were overlaid onto a single temporal memory segment before the improper firing of cells caused an error in the temporal memory system. The number of possible overlaid vectors may exceed twenty. The number of vectors that can be overlaid on a temporal memory segment depends on various factors such as the total number of cells.

The overlaying of the different set of cell activation states onto a single temporal memory segment is computationally efficient because a single pass of the activation window is needed to determine if the cell should be activated by the sequence inputs. That is, the activation window need not pass different branches or chains of temporal memory segments, thereby reducing computation and time for detecting all combinations of cell activations states in a cell.

The above methods of expanding the capacity of the sequence processor are not mutually exclusive. Hence, one or more of the above methods may be employed to expand the capacity of the sequence processor.

Example of Temporal Processing

Figure 15A:
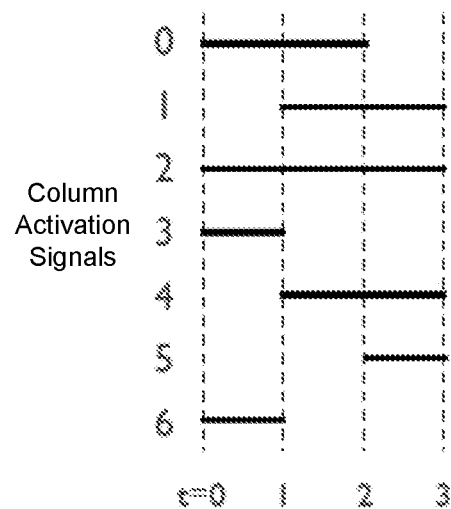
FIG. 15A is example cell activation signals provided to a sequence processor, according to one embodiment.
Figure 15B:
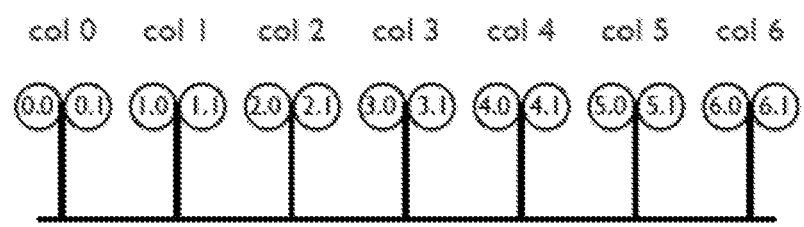
FIG. 15B is a diagram illustrating the identification of columns and cells, according to one embodiment.

An example of temporal processing is described herein with reference to FIGS. 15A through 20D. In the following example, the structure of cell 850 of FIG. 8C is used. However, similar temporal processing may be formed for cells 800 and 880. FIG. 15A illustrates column activation signals at different time steps derived from sparse vector 342. FIG. 15B illustrates the structure of columns, cells and their notations used in the example. A total of six columns with two cells in each column are used in this example. Each cell is identified by a column number followed by a dot (.) and a cell number. For example, 0.1 indicates a second cell in the first column. The number of cells and columns has been reduced to facilitate understanding. In practical applications, however, more cells and columns are likely to be employed. Hashed circles represent cells activated by sparse vector 342, and circles with dots indicate cells activated by the sequence inputs.

In the following example, the operation of the sequence processor is described using two different phases in a time step, as described above in FIG. 10. In the first phase, the cells generate both a sequence outputs and a pooling output in the current time step based on sequence inputs from other cells in the previous time step and sparse vector 342 in the current step. In this phase, the cells also learn and store states of cell activations in their first temporal memory segments if the cells were first activated by select signal 646. Further, local inhibition is disregarded in the following example.

In the second phase, the cells use the sequence outputs generated in the first phase to activate cells in the current time step and also to generate pooling outputs. If the cells were first activated by the sequence outputs, the cells store the cell activation states of the previous time step in their temporal memory segments other than the first temporal memory segments. For simplification, cells are activated by sequence inputs only if the sequence inputs indicate activation of all cells in the stored cell activation states. Implications associated with an activation window are omitted herein for the sake of brevity.

FIGS. 16A through 16D illustrate signals and states of the cells at initial start-up, according to one embodiment. FIG. 16A indicates the column activation signals for each column during this time step. Dashed box in FIG. 16A indicate column activation signals in the current time step. FIG. 16B illustrates the activation status of cells in previous time step (t=−1) and current time step (t=0). Because FIGS. 16A and 16B illustrate the initial start up, no cells were active in the previous time step (t=−1). Upon receiving the column activation signals, cells 0.0, 0.1, 2.0, 2.1, 3.0, 3.1, 6.0 and 6.1 are activated. As a result, cells 0.0, 0.1, 2.0, 2.1, 3.0, 3.1, 6.0 and 6.1 start to produce pooling outputs and sequence outputs as illustrated in FIG. 16C (first phase). The dashed horizontal lines in FIG. 16C represent that both the pooling outputs and sequence outputs generated. In this time step, no cell activation states for the first temporal memory segments are learned by any cells because no cells were active in the previous time step (first phase). In the second phase, no cell is activated based on sequence inputs because no cell has yet learned any cell activation states. There are also no previous cell activation states to be stored.

FIG. 17A illustrates the column activation signals for each column in time step 1. In this time step, columns 1 and 4 are newly activated by the column activation signals. Columns 0 and 2 remain activated based on the column activation signals. Since there are cell activations in the previous time step (t=0) and no cells in these columns are already active, one cell is selected at random from each column newly activated by the column activation signals. In this example, cells 1.0 and 4.0 are chosen to learn connections from cell activation states in the previous time step (t=0). These chosen cells become active to generate sequence outputs and pooling outputs as illustrated in FIG. 17C. Cell 1.0 randomly chooses to make connections from cells 0.1 and 3.1 that were activated in the previous time step (t=0). Similarly, cell 4.0 randomly chooses to make connections from cells 6.0 and 0.1 that were active in the previous time step (t=0). FIG. 17D illustrates these connections stored in first temporal memory segments of cells 1.0 and 4.0.

In the second phase, no cells are activated based on sequence inputs, and hence, there are no cell activation states to be stored in temporal memory segments other than the first temporal memory segments, for the same reason as described above with reference to FIG. 16D.

Figure 18B:
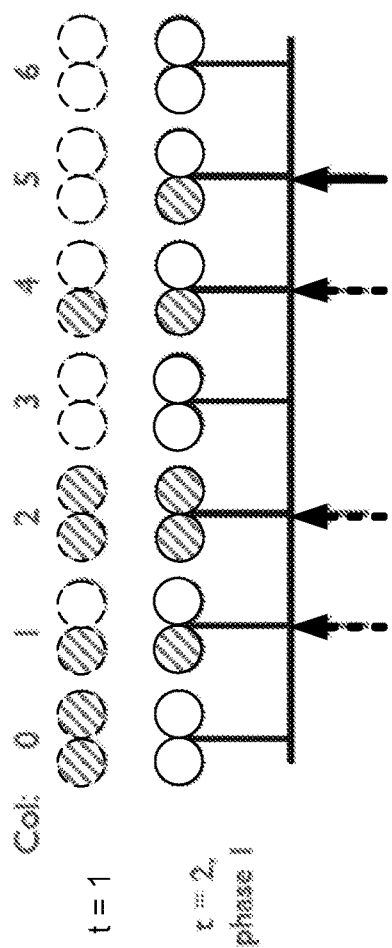
Figure 18D:
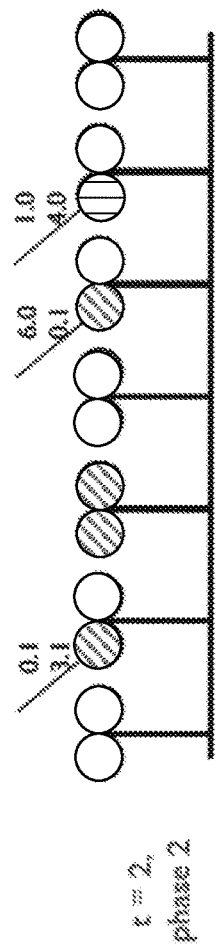
Figure 18A:
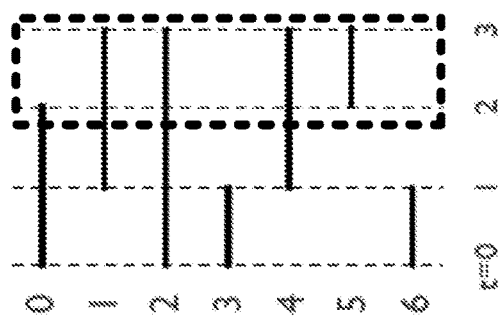
Figure 18C:
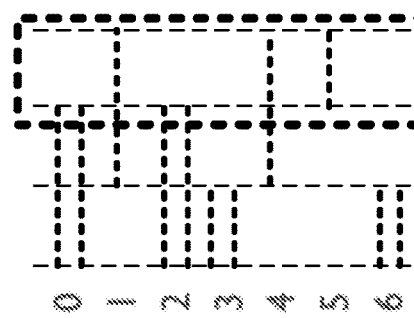

FIG. 18A illustrates the column activation signals for each column in time step 2. In this time step, only column 5 is newly activated by the column activation signal. Columns 1, 2 and 4 remain activated by the column activation signal, and therefore, the cells that were active in previous time step (t=1) continue to remain activated. Column 5 is newly activated and cell 5.0 is randomly chosen to establish connections to previous cell activation states. Cell 5.0 randomly chooses to establish connections from cells 1.0 and 4.0, and stores the activation states of these cells. Cell 5.0 stores connections to cells 1.0 and 4.0 in the first temporal memory segment, as illustrated in FIG. 18D.

In the second phase, cell 5.0 does not learn any new connections in temporal memory segments other than the first temporal memory segment because cell 5.0 was first activated by the column activation signal.

Figure 19B:
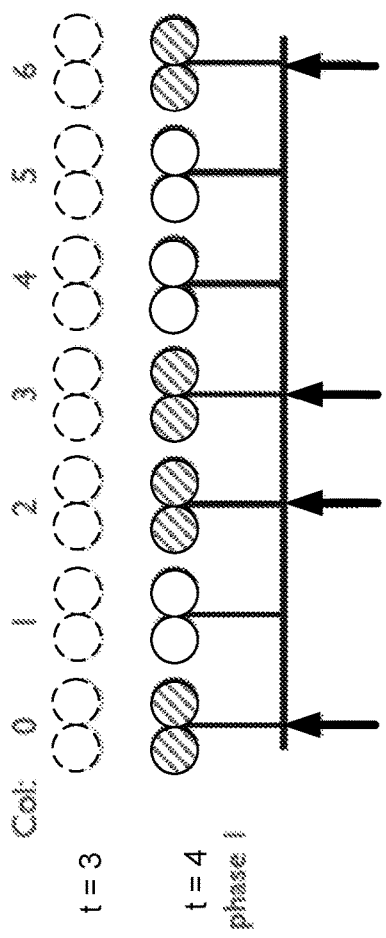
Figure 19D:
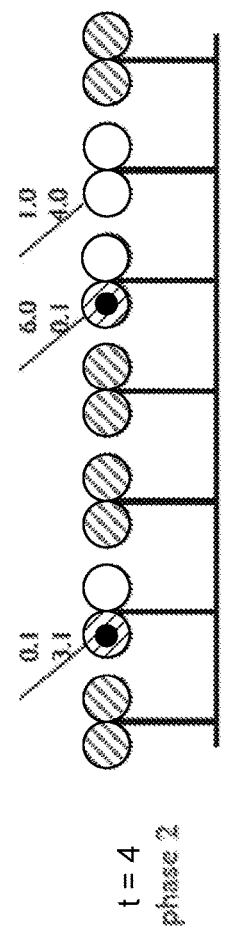
Figure 19A:
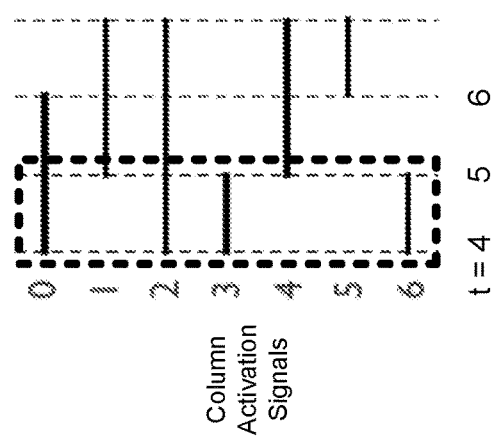
Figure 19C:
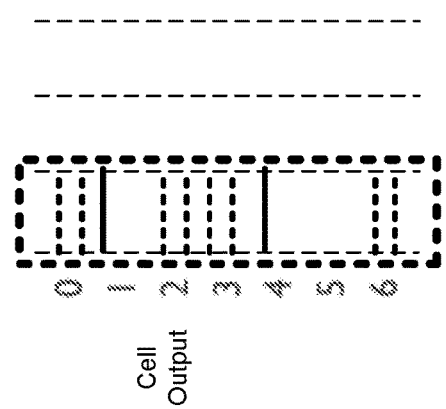

The cell activation states are cleared in time step 3. After clearing the cell activation states, the sequence processor is exposed to the same column activation signal in time steps 4 and 5 to expand learning. FIG. 19A illustrates the column activation signals in time step 4 that are the same as the column activation signals in time step 0. In the first phase, cells 0.0, 0.1, 2.0, 2.1, 6.0 and 6.1 are activated by the column activation signals. As a result, cells 0.0, 0.1, 2.0, 2.1, 6.0 and 6.1 start to produce pooling outputs and sequence outputs as illustrated in FIG. 19C. There is no learning for first temporal memory segments of any cells because cell activation states were previously cleared.

In the second phase, cells 1.0 and 4.0 are activated by sequence outputs from cells 0.1, 3.1 and cells 6.0 and 0.1, respectively. Hence, cells 1.0 and 4.0 start producing pooling outputs (see FIG. 11, step 1120). There are no previous cell activation states to make further connections to cells 0.1 and 4.0 because cell activation states were previously cleared. Therefore, no connections are established in second temporal memory segments.

FIG. 19C illustrates two additional solid lines compared to FIG. 16C. The additional solid lines represent cells 1.0 and 4.0 becoming active earlier and producing pooling output based on sequence inputs. As the sequence processor is exposed to the same temporal sequences over multiple rounds, the cells learn connections to earlier cell activation states and activate earlier. As a result, the resulting pooling outputs from the sequence processor become more stable and invariant.

Figure 20A:
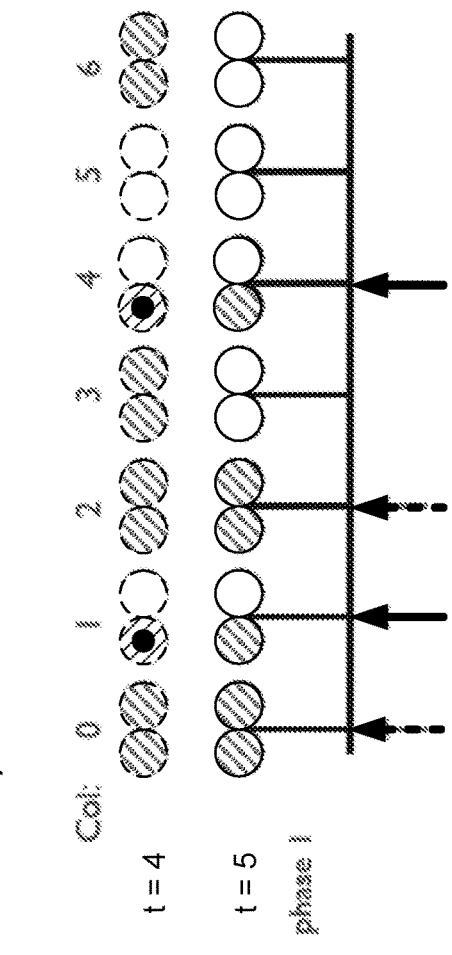
Figure 20B:
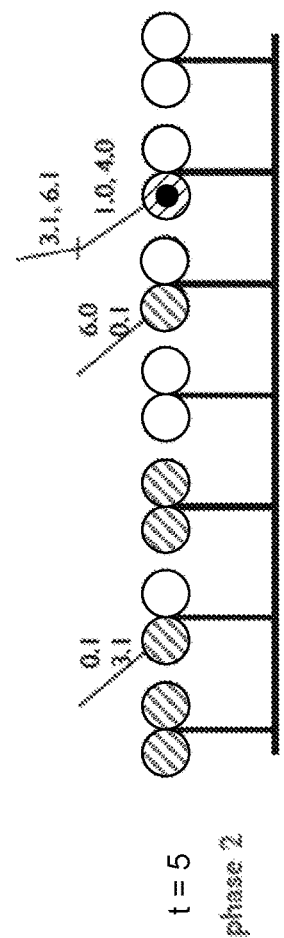

FIG. 20A illustrates the column activation signals in time step 5 that are the same as the column activation signals in time step 1. In the first phase, cells 1.0 and 4.0 generate sequence outputs because these cells were already producing pooling outputs in the previous time step (t=3) (see FIG. 11, step 1112) and are now receiving column activation signals. Since cells 1.0 and 4.0 were already active in the previous time step, no new sequence inputs are stored in the first temporal memory segments.

Figure 20C:
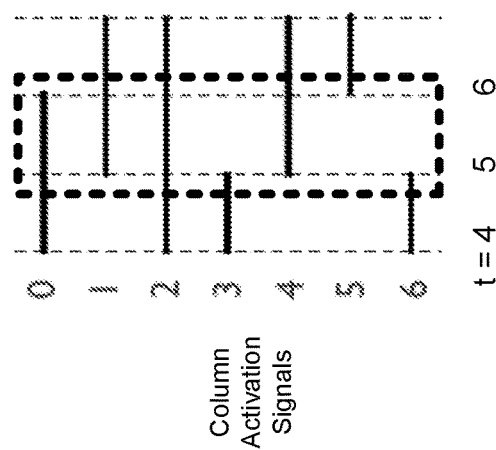
Figure 20D:
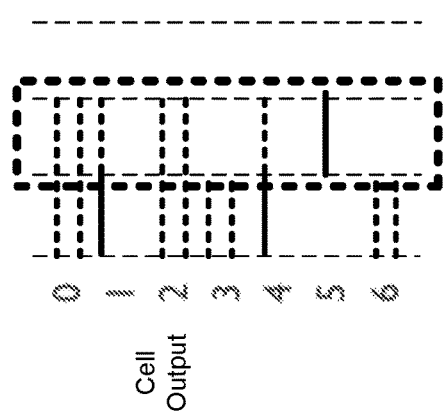

In the second phase, cell 5.0 is activated by connections to cells 1.0 and 4.0 stored in the first temporal memory segment of cell 5.0. Cell 5.0 is newly activated by its first temporal memory. Because cells were active in the previous time step (t=4), cell 5.0 learns connections to cell activation states of the previous time step (t=4). Specifically, cell 5.0 randomly chooses cells 3.1 and 6.1, and stores the connections to cells 3.1 and 6.1 in the second temporal memory (see FIG. 13, step 1350). Cell 5.0 also starts to produce a pooling output, as illustrated in FIG. 20C.

Although the column activation signals were repeated only twice in this example, the same column activation signals may be fed more than twice. As the columns are fed with additional rounds of column activation signals, the cells learn longer sequences of patterns.

The process and mechanism described above with reference to FIGS. 16A through 20D are merely illustrative. In another embodiment, parallel processing may be used to obviate processing in two different phases. Moreover, local inhibition may be introduced to inhibit activation of cells within a certain topological distance from dominant cells.

Learning and Unlearning of Connections

Spatial pooler 320 may be trained or conditioned to add mapping of a CD to elements in its input space that are productive in detecting co-occurrences and/or remove mapping to elements in the input space that are unproductive in detecting co-occurrences. In one embodiment, spatial pooler 320 retains mapping between a CD and an input element that often contributes to high match scores of the CD while removing mappings that do not contribute or negatively affect high match scores. The mapping of input elements may be iteratively updated during the training process until all CDs yield high match scores at about the same frequency.

In one embodiment, a permanence value is assigned to each mapping between a CD and an input element to implement learning and unlearning in spatial pooler 320. The permanence value represents the contribution of an input element to detection of a co-occurrence. When mapping between a CD and its input element contributes to a higher match score, the permanence value is increased. Conversely, when mapping between a CD and its input element does not contribute to a higher match score, the permanence value is decreased. When the permanence value of certain mapping drops below a preset limit, the mapping corresponding to the permanence value is removed and replaced with mapping to another input element within the input space of the corresponding CD.

In one embodiment, the new input element mapped to the CD may be chosen randomly from the input space. In another embodiment, permanence values for potential mappings between the CD and the input elements may be maintained. If a permanence value for a potential mapping becomes larger than a permanence value for an existing mapping, the potential mapping with the higher permanence value replaces the existing mapping. By changing the mapping based on the permanence value, more productive mappings may replace less productive mappings, thereby contributing to a processing node that performs better prediction or inference.

In one embodiment, a global decay function is implemented. The global decay function reduces the permanence value of all mappings associated with a CD as new bottom-up input signals are received or time passes. The global decay function removes mapping to an input element if the mapping does not contribute to a higher match number at all or contributes to a higher match number at a frequency below a threshold.

In one embodiment, the permanence value of a mapping is decreased if the same mapping is also present in another CD that yields a high match score.

In one embodiment, an activation function is employed to increase the possibility that CDs of lower match scores are selected. Even after learning, some CDs may not learn co-occurrences that yield sufficiently high match scores to become a dominant CD at a desired frequency. These CDs with lower match scores may never or seldom get selected due to the presence of other CDs with higher match scores. The CDs that yield only lower match scores or seldom reach a high match score may nonetheless detect co-occurrences valuable to the performance of temporal memory systems. To enable selection of CDs with otherwise low match scores, an activation function may be used to increase the match score relative to other CDs that are often selected by increasing the match score of the seldom selected CD by a factor or reducing the match scores of CDs that are often selected.

Using the activation function is advantageous, among other reasons, because the activation functions allow CDs to divide up possible co-occurrences in a productive way, and also allows CDs to automatically map to new co-occurrence patterns if the sensed input is lost or statistics in the spatial patterns in the sensed input changes over time.

In one embodiment, the permanence values of the mappings may be adjusted, or the activation function may be employed such that mappings between a CD to input elements is relatively sparse. In other words, the percentage of the number of mappings between a CD and corresponding input elements to the number of possible mappings may be less than a predetermined threshold, for example, less than 10%, or less than 1%.

Sequence processor 314 in a cell may also learn mapping to other cells that contribute to activation of the cell and/or unlearn mapping to other cells that do not contribute to the activation of the cell. In embodiments that require only a portion of elements in the sequence input 830 to match the elements stored in a temporal memory segment or elements covered by an activation window, the sequence processor 314 retains mapping to other cells that often contribute to the activation of the cell. Conversely, mapping to other cells that often fail to contribute to the activation of the cell is removed and replaced with mapping to another cell.

For this purpose, not only the spatial pooler 320 but sequence processor 314 may also implement one or more of the permanence value, global decay function and activation function described above with reference to spatial pooler 320. The difference of operation in sequence processor 314 compared to the operation of spatial pooler 320 is that the sequence processor 314 learns or unlearns mapping to other cells associated with the sequence input 830 whereas spatial pooler 320 learns or unlearns mapping to input elements in the input space.

In one embodiment, cell 800 in the sequence processor 314 has a fixed number of temporal memory segments. In such case, learning or unlearning involves adding or removing connections of other cells associated with sequence input 830. In another embodiment, cell 800 may newly add or delete the temporal memory segments where each temporal memory segment is connected to different sets of cells within a certain logical distance.

Accelerated Learning and Enhanced Memory Management

In applications where different parts of the input space of the temporal memory system are exposed to the same or similar input patterns, learning at the processing node can be expedited by using a master memory that stores information received from multiple CDs and columns. In image recognition, for example, various blocks of input space often detect similar or the same co-occurrences. Such co-occurrences may represent, for example, horizontal lines, vertical lines and diagonal lines. Hence, it is efficient in terms of training and memory management to share the information about such co-occurrences across multiple CDs in spatial pooler 320. Moreover, certain temporal sequences resulting from movements of images (e.g., translational movement of images) results in similar or the same changes in temporal sequences at different columns in sequence processor 314. Hence, it is also efficient to share information about temporal sequences across multiple columns in sequence processor 314.

Figures 21A, 21B:
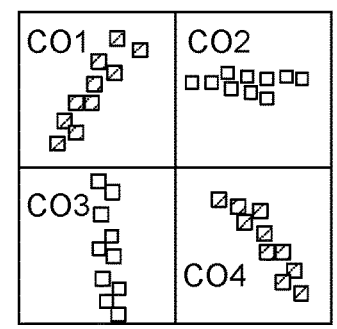
FIG. 21A is a diagram illustrating placing of input space blocks for image recognition, according to one embodiment.
FIG. 21B is a diagram illustrating master co-occurrences according to one embodiment.

FIG. 21A is a diagram illustrating an image for recognition divided into 4×4 blocks of input space A1 through D4. The lowest level of a HTM system has spatial pooler 320 that receives sensory input corresponding to black and white pixels in the image. Specifically, each block of input space is assigned to a CD in spatial pooler 320. The CD is mapped to learn co-occurrences such as horizontal lines, vertical lines or diagonal lines by retaining mapping to sub-sampled pixels that contribute to higher match scores but removing mapping to sub-sampled pixels that do not contribute to higher match scores, as described above in detail in the section entitled "Learning and Unlearning of Connections." The columns in sequence processor 314 learn temporal sequences associated with a co-occurrence learned by a corresponding CD in spatial pooler 320.

FIG. 21B is a diagram illustrating master co-occurrences CO1 through CO4 stored in the master memory. Each CD is associated with one of the master co-occurrences CO1 through CO4. The input space blocks are associated with the co-occurrences CO1 through CO4 in an alternating manner. For example, CDs associated with input space blocks A1, B1, C1 and D1 are assigned to master co-occurrence CO1; CDs associated with input space blocks A2, B2, C2 and D2 are assigned to master co-occurrence CO2; CDs associated with input space blocks A3, B3, C3 and D3 are assigned to master co-occurrence CO3; and CDs associated with input space blocks A4, B4, C4 and D4 are assigned to master co-occurrence CO4. As an image is presented, pixel information for all CDs assigned to the same master co-occurrence is processed to learn or unlearn mapping of the master co-occurrence to sub-sampled pixels in the associated input space blocks. Although only four master co-occurrences CO1, CO2, CO3 and CO4 are described herein for the sake of convenience, in practice, there may be many more master co-occurrences in the master memory.

As images are presented to the temporal memory system, a CD for input space block A1 (i) receives pixel information from sub-sampled pixels in the input space block A1 according to the master co-occurrence CO1, (ii) updates the permanence values for sub-sampled pixels of master co-occurrence CO1 according to the contribution of the sub-sampled pixel to a higher match score, and (iii) replaces mapping to a pixel with mapping to another pixel if a permanence value for the pixel drops below a preset limit.

CDs for input blocks B1, C1 and D1 also perform the same process of receiving pixel information of pixels selected by master co-occurrence CO1, modifying the permanence values, and replacing the mapping of master co-occurrence CO1 to a pixel if the permanence value for the pixel drops below a preset limit. The master co-occurrences are updated four times by presentation of a single image, which allows the master co-occurrences to converge to desirable mapping at four times the speed of training CDs individually.

CDs associated with input space blocks A2, B2, C2 and D2 perform the same process for master co-occurrence CO2. CDs associated with input space blocks A3, B3, C3 and D3 perform the same process for master co-occurrence CO3. CDs associated with input space blocks A4, B4, C4 and D4 perform the same process for master co-occurrence CO2.

In one embodiment, each CD stores a pointer to its master co-occurrence. The CD uses the pointer to retrieve information about the locations of the sub-sampled pixels, and to update the selection of the sub-sampled pixels if certain sub-sampled pixels are not productive in increasing the match scores. In another embodiment, each CD may have its own memory that replicates and stores information about co-occurrences from the master co-occurrences.

Although the example of FIGS. 21A and 21B was described with respect to learning or unlearning connections (i.e., mapping to pixels) in spatial pooler 320, the same principle can be applied to information associated with columns in sequence processor 314. For each column, the master memory may store master column information about connections of cells to other cells for receiving sequence input 830 and information of activation states of cells in temporal memory segments. Multiple columns in sequence processor 314 may be assigned to the same master column information. Each of the assigned columns references and updates the corresponding master column information.

In applications such as recognition of objects in moving pictures, the learning at sequence processor 314 can be expedited by processing a set of images with smaller translational movements instead of processing a series of images with larger transitional movements. For an original image of an object, a series of images representing spatially shifted versions of the original image are generated. The maximum number of pixels shifted is, for example, 5 pixels. Then various sequences of shifted images and the original image are generated and presented to the processing node 300 to learn temporal sequence of images. Other images having the object appear at different locations are received and processed in the same manner. In this way, the processing node 300 can learn temporal sequences of the object in a more efficient and faster manner compared to presenting a series of images where the object makes long transitional movement.

Performance Enhancements and Application Modifications

In one embodiment, a cell in sequence processor 314 employs "forgetting" or "unlearning" of cell activation states by removing unproductive connections stored in its temporal memory segments. DMM 920 monitors activation of cell 800 and column activation signal 634 to determine if the cell activation states stored in a temporal memory segment resulted in improper activation of cell 800.

For each temporal memory segment or set of cell activation states, DMM 920 tallies a productivity score that is increased or decreased depending on whether column activation signal 634 activating the column followed early activation of cell 800 by each temporal memory segment or the set of cell activation states. If cell activation states stored in a temporal memory segment resulted in activation of cell 800 but was not followed by column activation signal 634 activating the column, the productivity score for the cell activation states or temporal memory segment is reduced. Conversely, the productivity score is increased if the stored cell activation states or temporal memory segment contributed to correct activation of cell 800. If the productivity score drops below a threshold, the cell activation states are deleted or the temporal memory segment is initialized to "forget" the learned connections.

In one embodiment, proximity representing real-world time is used to influence detecting and storing of activation states of cells. In another embodiment, relative spacing of time may be embodied to store activation states of cells or perform inference or prediction.

In one embodiment, an external signal representing a degree of focus of attention to learning is provided to the temporal memory system to differ parameters associated with detecting and storing cell activation states. The parameters set by the external signal may include, for example, the productivity score or the minimum number of cells stored in temporal memory to activate a cell.

One of many advantages in embodiments is that learning can be performed simultaneously while performing inference and/or prediction. Regardless of whether cells are currently learning, the cells continue to produce pooling outputs and sequence outputs based on prior learning and bottom-up input. Therefore, a processing node can perform learning and inference/prediction simultaneously.

In one embodiment, learning and inference can be achieved simultaneously by first activating all cells in an active column that did not receive sufficient sequence inputs for activation to allow inference to proceed. After performing inference, all cells except one cell in the active column are turned off. The one remaining cell forms connections to previous cell activation states. When combined with rules for forgetting connections, the temporal memory system can learn to represent common sequences of patterns embedded within noise.

Another advantage is that embodiments may operate with bottom-up input 328 with differing data rates. The operation of the sequence processor is driven by changes in bottom-up input 328 and not the data rate at which bottom-up input 329 is received or by any clocking mechanism. Other than any delays caused by processing speed, the sequence processor will operate in the same manner at different levels of the HTM system regardless of whether the bottom-up input 328 changes at a fast rate or a slow rate. Hence, no synchronization of timing is needed to coordinate operation of multiple processing nodes. Further, the difference in the data rate does not affect the performance of the HTM system. Therefore, the HTM system shows robust performance to various data rates.

Processing nodes and temporal memory systems according to embodiments also provide improved immunity to various types of noise. The improved immunity to noise is attributable partly to the use of sparse distributed representation.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A processing node in a computing device, comprising:
a plurality of co-occurrence detectors configured to receive an input signal, and generate a plurality of match scores, each co-occurrence detector configured to generate a match score based on a subset of elements in the input signal mapped to the co-occurrence detector; and
a sparsity generator configured to receive the plurality of match scores, and generate a spatial pooler output in sparse distributed representation, wherein the sparsity generator is configured to:
select a subset of the co-occurrence detectors based on the match scores generated by the co-occurrence detectors, and
generate the spatial pooler output by setting elements for a remaining subset of the co-occurrence detectors to a value indicative of non-selection and setting elements for the selected subset of co-occurrence detectors to the match scores or values derived from the match scores of the selected subset of co-occurrence detectors.

2. The processing node of claim 1, wherein the match score for a co-occurrence detector represents a degree of match between a co-occurrence pattern assigned to the co-occurrence detection.

3. The processing node of claim 1, wherein the input signal is represented by a vector with a plurality of elements in zero or scalar values.

4. The processing node of claim 1, wherein the spatial pooler output is represented by a vector with a plurality of elements in zero or scalar values.

5. The processing node of claim 4, wherein elements of the spatial pooler output corresponding to the selected subset of co-occurrence detectors are assigned the match scores of the selected subset of co-occurrence detectors, and the elements of the spatial pooler output corresponding to the remaining subset of co-occurrence detectors are assigned a value of zero.

6. The processing nodes of claim 1, wherein the sparsity generator is configured to:
process the match scores of the plurality of co-occurrence detectors with a convolution max function to generate intermediate scores for the plurality of co-occurrence detectors, and
select the co-occurrence detectors with highest intermediate scores.

7. The processing nodes of claim 1, wherein the subset of co-occurrence detectors with highest match scores are selected.

8. The processing node of claim 1, wherein each co-occurrence detector is mapped to a subset of elements in the input signal, and wherein the match score of each co-occurrence detector is generated by applying a set of weights for the co-occurrence detector to the subset of elements in the input signal.

9. The processing node of claim 1, wherein the sparse distributed representation includes 1 to 10% of elements that are assigned non-zero values.

10. The processing node of claim 1, wherein the input signal changes over time and the sparsity generator is further configured to:
generate a series of spatial pooler outputs including the spatial pooler output in sparse distributed representation,
determine a frequency at which each of the plurality of co-occurrence detectors is selected, wherein the plurality of co-occurrence detectors including a first co-occurrence detector and a second co-occurrence detector selected more frequently than the first co-occurrence detector over a predetermined amount of time,
increase likelihood of selecting the first co-occurrence detector relative to the second co-occurrence detector by processing match scores of the first and second co-occurrence detectors using an activation function, and
select the co-occurrence detectors based on the processed match scores.

11. The processing nodes of claim 10, wherein each of the series of spatial pooler outputs has the same number of active elements.

12. A predictive system, comprising:
a first processing node configured to receive an input signal, and generate a first spatial pooler output;
a second processing node configured to receive the first spatial pooler output, and generate a second spatial pooler output in sparse distributed representation, wherein the second processing node comprises:
a plurality of co-occurrence detectors, each co-occurrence detector in the plurality of co-occurrence detectors configured to generate a match score based on a subset of elements in the first spatial pooler output mapped to the co-occurrence detector,
wherein the second spatial pooler output represents selection of a subset of the co-occurrence detectors based on match scores generated by the co-occurrence detectors, wherein elements for a remaining subset of the co-occurrence detectors are set to a value indicative of non-selection and elements for the selected subset of the co-occurrence detectors are set to match scores or values derived from the match scores for the selected subset of the co-occurrence detectors.

13. The predictive system of claim 12, wherein the predictive system is a neural network including a set of processing nodes including the first processing node and the second processing node.

14. The predictive system of claim 12, wherein the first spatial pooler output is represented by a vector with a plurality of elements in zero or scalar values, and wherein the second spatial pooler output is represented by a vector with a plurality of elements in zero or scalar values.

15. The predictive system of claim 14, wherein elements of the second spatial pooler output corresponding to the selected subset of co-occurrence detectors are assigned the match scores of the selected subset of co-occurrence detectors, and the elements of the second spatial pooler output corresponding to the remaining subset of co-occurrence detectors are assigned a value of zero.

16. The predictive system of claim 12, wherein the second processing node is configured to:
  process match scores of the plurality of co-occurrence detectors with a convolution max function to generate intermediate scores for the plurality of co-occurrence detectors, and
  select the co-occurrence detectors with highest intermediate scores.

17. The predictive system of claim 12, wherein the subset of co-occurrence detectors with highest match scores are selected.

18. The predictive system of claim 12, wherein the first processing node includes another plurality of co-occurrence detectors, each co-occurrence detector in the another plurality of co-occurrence detectors configured to generate a match score based on a subset of elements in the input signal mapped to the co-occurrence detector, elements in the first spatial pooler output corresponding to the another plurality of co-occurrence detectors.

19. The predictive system of claim 18, wherein each co-occurrence detector in the plurality of co-occurrence detectors is mapped to a subset of elements in the first spatial pooler output, and wherein the match score of each co-occurrence detector is generated by applying a set of weights for the co-occurrence detector to the subset of elements in the first spatial pooler output.

20. The predictive system of claim 12, wherein the sparse distributed representation includes 1 to 10% of elements that are assigned non-zero values.

* * * * *